United States Patent
Yabunouchi et al.

(10) Patent No.: US 6,825,294 B1
(45) Date of Patent: Nov. 30, 2004

(54) CATALYSTS FOR POLYMERIZING STYRENE AND OTHER MONOMER AND PROCESS FOR PRODUCING STYRENE POLYMER

(75) Inventors: Nobuhiro Yabunouchi, Ichihara (JP); Norio Tomotsu, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/646,128

(22) PCT Filed: Jan. 19, 2000

(86) PCT No.: PCT/JP00/00230

§ 371 (c)(1),
(2), (4) Date: Sep. 28, 2000

(87) PCT Pub. No.: WO00/44794

PCT Pub. Date: Aug. 3, 2000

(30) Foreign Application Priority Data

Jan. 29, 1999 (JP) .......................................... 11-022076

(51) Int. Cl.$^7$ .......................... C08F 4/602; C08F 12/08
(52) U.S. Cl. ................. 526/151; 526/124.9; 526/125.1; 526/126; 526/127; 526/153; 526/160; 526/161; 502/129; 502/132; 502/171
(58) Field of Search ................................. 526/151, 153, 526/160, 161, 124.9, 125.1, 126, 127, 150, 140, 141, 142; 502/129, 132, 171, 131, 134

(56) References Cited

U.S. PATENT DOCUMENTS

| | | | |
|---|---|---|---|
| 4,304,684 A | * | 12/1981 | Langer .................... 502/123 |
| 4,496,660 A | * | 1/1985 | Gessell et al. ............. 502/111 |
| 4,540,756 A | * | 9/1985 | Johnson .................... 526/124 |
| 5,739,227 A | * | 4/1998 | Teshima et al. ............ 526/153 |
| 5,908,903 A | * | 6/1999 | Rosch ....................... 526/153 |
| 6,011,127 A | * | 1/2000 | Monoi et al. ............ 526/153 X |
| 6,184,316 B1 | * | 2/2001 | Masi et al. ................. 526/142 |

FOREIGN PATENT DOCUMENTS

| | | |
|---|---|---|
| EP | 0 322 663 | 7/1989 |
| EP | 0 322 663 A2 * | 7/1989 |
| JP | 9-165410 | 6/1997 |
| JP | 9-194521 | 7/1997 |
| JP | 9-255711 | 9/1997 |
| WO | WO 94/07927 | 4/1994 |
| WO | 94/07927 * | 4/1994 |

* cited by examiner

*Primary Examiner*—Fred Teskin
(74) *Attorney, Agent, or Firm*—Oblon, Spivak, McClelland, Maier & Neustadt, P.C.

(57) ABSTRACT

Provided are catalysts for styrene polymerization capable of efficiently and inexpensively producing styrenic polymers having a syndiotactic structure; and a method for producing styrenic polymers. The catalysts comprise (A) a transition metal compound, (B) an oxygen-containing compound and/or a compound capable of reacting with a transition metal compound to form an ionic complex, (C) a specific metal compound, preferably a specific organoaluminium compound of a general formula:

$$((R^1)_3-CO)_n\text{-Al-}(R^2)_{3-n}$$

wherein $R^1$ represents an aliphatic hydrocarbon group having from 1 to 30 carbon atoms, an aromatic hydrocarbon group having from 6 to 30 carbon atoms or the like; $R^2$ represents a hydrocarbon group; n is 1 or 2, and optionally (D) an alkylating agent. In the method for producing styrenic polymers, used is the catalyst.

38 Claims, No Drawings

CATALYSTS FOR POLYMERIZING STYRENE AND OTHER MONOMER AND PROCESS FOR PRODUCING STYRENE POLYMER

TECHNICAL FIELD

The present invention relates to catalysts for polymerization of styrenes, and to a method for producing styrenic polymers. Precisely, it relates to catalysts for styrene polymerization comprising, as one component, a specific compound, and to an inexpensive and efficient method for producing styrenic polymers with the catalysts, more precisely, to a method for producing styrenic polymers essentially having a syndiotactic structure.

BACKGROUND ART

Recently, metallocene catalysts have been developed and used for styrenic polymer production, which comprise, as the catalyst component, a transition metal compound having a π-ligand bonded to the center metal element via a group.

To exhibit satisfactory activity, however, the catalysts of that type require a large amount of promoters such as aluminoxanes and the like. Therefore, they are problematic in that the total catalyst costs are inevitably high, and, in addition, the catalyst residue resulting from the promoter used often remains in the polymers produced thereby unfavorably discoloring the polymers.

In that situation, techniques of using clay, clay minerals and the like in place of aluminoxanes have been proposed so as to reduce the amount of the promoters to be used along with the catalysts (Japanese Patent Laid-Open Nos. 301917/1993, 136047/1994, etc.).

At present, however, even these techniques could not as yet provide catalysts having satisfactorily high activity.

DISCLOSURE OF THE INVENTION

The object of the present invention is to provide catalysts for styrene polymerization capable of efficiently and inexpensively producing styrenic polymers, in particular, those essentially having a syndiotactic structure, and to provide a method for producing styrenic polymers.

We, the present inventors have assiduously studied so as to attain the object as above, and, as a result, have found that polymerization catalysts containing, as one component, a specific compound have improved polymerization activity and therefore the amount of the promoters such as oxygen-containing compounds and others to be used with them can be reduced. On the basis of this finding, we have completed the present invention.

Specifically, the invention provides catalysts for polymerization of styrenes and a method for producing styrenic polymers, which are as follows:

1. A catalyst for polymerization of styrenes, which comprises:
   (A) a transition metal compound,
   (B) an oxygen-containing compound and/or a compound capable of reacting with a transition metal compound to form an ionic complex,
   (C) a compound of a general formula (1):

$$((R^1)_3-X-Y)n-Z-(R^2)m-n \qquad (1)$$

wherein $R^1$ represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, or a carboxyl group, $R^1$'s may be the same or different, and $R^1$'s may be optionally bonded to each other to form a cyclic structure; X represents an element of Group 14 of the Periodic Table; Y represents an element of Group 16 of the Periodic Table; Z represents a metal element of Groups 2 to 13 of the Periodic Table; $R^2$ represents a hydrocarbon group; m is an integer, indicating the valency of the metal element Z; and n is an integer of from 1 to (m−1),
   and optionally,
   (D) an alkylating agent.

2. A catalyst for polymerization of styrenes, which comprises:
   (A) a transition metal compound,
   (C) a compound of a general formula (1):

$$((R^1)_3-X-Y)n-Z-(R^2)m-n \qquad (1)$$

wherein $R^1$ represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, or a carboxyl group, $R^1$'s may be the same or different, and $R^1$'s may be optionally bonded to each other to form a cyclic structure; X represents an element of Group 14 of the Periodic Table; Y represents an element of Group 16 of the Periodic Table; Z represents a metal element of Groups 2 to 13 of the periodic Table; $R^2$ represents a hydrocarbon group; m is an integer, indicating the valency of the metal element Z; and n is an integer of from 1 to (m−1),
   and optionally,
   (D) an alkylating agent.

3. The catalyst of above 1 or 2 for polymerization of styrenes, wherein, in (C), X is carbon, Y is oxygen and Z is aluminium.

4. The catalyst of above 1 or 2 for polymerization of styrenes, wherein the compound (C) is a reaction product of <1> at least one selected from compounds of genera formulae $(R^1)_3-C-R^3$, $R^4-CO-R^5$, or $R^6-CO-R^7$, and <2> a compound of a general formula, $Z(R^2)_m$:
   in which $R^1$ is a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an alyloxy group having from 6 to 30 carbon atoms, a thioalkoxy group having from 1 to 30 carbon atoms, or a thioaryloxy group having from 6 to 30 carbon atoms; $R^3$ is hydroxyl, an alkoxy group having from 1 to 30 carbon atoms, an aryloxy group having from 6 to 30 carbon atoms, a thioalkoxy group having from 1 to 30 carbon atoms, or a thioalyloxy group having from 6 to 30 carbon atoms; $R^4$ and $R^5$ each represents hydrogen, halogen, an aliphatic hydrocarbon group having from 1 to 30 carbon atoms or an aromatic hydrocarbon group having from 6 to 30 carbon atoms; $R^6$ is a hydrogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atom, or a thioaryloxy group having from 6 to 30 carbon atoms or an amino group; and $R^7$ is hydroxy an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms; or an amino group; and $R^1$ and $R^3$ or $R^4$ and $R^5$ or $R^6$ and $R^7$ may be optionally bonded to each other to form a cyclic structure; Z represents a metal element of Groups 2 to 13 of the Periodic Table; m is an integer, indicating the valency of the metal element Z; and $R^2$ represents a hydrocarbon group.

5. A catalyst for polymerization of styrenes, which comprises:
(A) a transition metal compound,
(B) an oxygen-containing compound and/or a compound capable of reacting with a transition metal compound to form an ionic complex,
(C1), at least one selected from compounds of general formulae $(R^1)_3$—C—$R^3$, $R^4$—CO—$R^5$, or $R^6$—CO—$R^7$:
  in which $R^1$ is a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms; $R^3$ is hydroxyl, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms; $R^4$ and $R^5$ each represents hydrogen, halogen, an aliphatic hydrocarbon group having from 1 to 30 carbon atoms or an aromatic hydrocarbon group having from 6 to 30 carbon atoms; $R^6$ is a hydrogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms or an amino group; and $R^7$ is hydroxy, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms or an amino group; and $R^1$ and $R^3$ or $R^4$ and $R^5$ or $R^6$ and $R^7$ may be optionally bonded to each other to form a cyclic structure,
(C2) a compound of a general formula, $Z(R^2)m$, wherein Z represents a metal element of Groups 2 to 13 of the Periodic Table; m is an integer, indicating the valency of the metal element Z; and $R^2$ represents a hydrocarbon group,
and optionally,
(D) an alkylating agent.

6. A catalyst for polymerization of styrenes, which comprises:
(A) a transition metal compound,
(C1), at least one selected from compounds of general formulae $(R^1)_3$—C—$R^3$, $R^4$—CO—$R^5$, or $R^6$—CO—$R^7$:
  in which $R^1$ is a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms; $R^3$ is hydroxyl, an alkoxy group having 1 to 30 carbon atoms, an aryloxy group having from 6 to 30 carbon atoms, a thioalkoxy group having from 1 to 30 carbon atoms, or a thioaryloxy group having from 6 to 30 carbon atoms; $R^4$ and $R^5$ each represents hydrogen, halogen, an aliphatic hydrocarbon group having from 1 to 30 carbon atoms or an aromatic hydrocarbon group having from 6 to 30 carbon atoms; $R^6$ is a hydrogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms or an amino group; and $R^7$ is hydroxy, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms or an amino group; and $R^1$ and $R^3$ or $R^4$ and $R^5$ or $R^6$ and $R^7$ may be optionally bonded to each other to form a cyclic structure,
(C2) a compound of a general formula, $Z(R^2)m$, wherein Z represents a metal element of Groups 2 to 13 of the Periodic Table; m is an integer, indicating the valency of the metal element Z; and $R^2$ represents a hydrocarbon group,
and optionally,
(D) an alkylating agent.

7. The catalyst of any of above 1 to 6 for polymerization of styrenes, wherein at least one of three $R^1$'s is an aromatic hydrocarbon group having from 6 to 30 carbon atoms.

8. The catalyst of any of above 1 to 6 for polymerization of styrenes, wherein three $R^1$'s are all aromatic hydrocarbon groups each having from 6 to 30 carbon atoms.

9. The catalyst of any of above 1 to 6 for polymerization of styrenes, wherein three $R^1$'s are all phenyl groups.

10. The catalyst of any of above 1 to 9 for polymerization of styrenes, wherein $R^2$ is an alkyl group having at least 2 carbon atoms.

11. The catalyst of any of above 4 to 10 for polymerization of styrenes, wherein Z is aluminium.

12. The catalyst of any of above 1 to 11 for polymerization of styrenes, wherein the transition metal compound (A) is represented by any of the following general formulae (2) to (6):

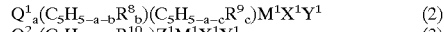
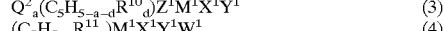
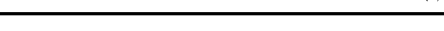

in which $Q^1$ represents a bonding group that crosslinks the two conjugated five-membered cyclic ligands ($C_5H_{5-a-b}R^8_b$) and ($C_5H_{5-a-c}R^9_c$); $Q^2$ represents a bonding group that crosslinks the conjugated five-membered cyclic ligand ($C_5H_{5-a-d}R^{10}_d$) and the group $Z^1$; $R^8$, $R^9$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 of the Periodic Table; $M^2$ represents a transition metal of Groups 8 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^1$, $L^2$, $X^1$, $Y^1$, $W^1$ and $U^1$ may be bonded to each other to form a cyclic structure.

13. The catalyst of above 12 for polymerization of styrenes, wherein, in the transition metal compound (A) of formula (4), the group $(C_5H_{5-e}R^{11}_e)$ is represented by any of the following general formulae (I) to (VII):

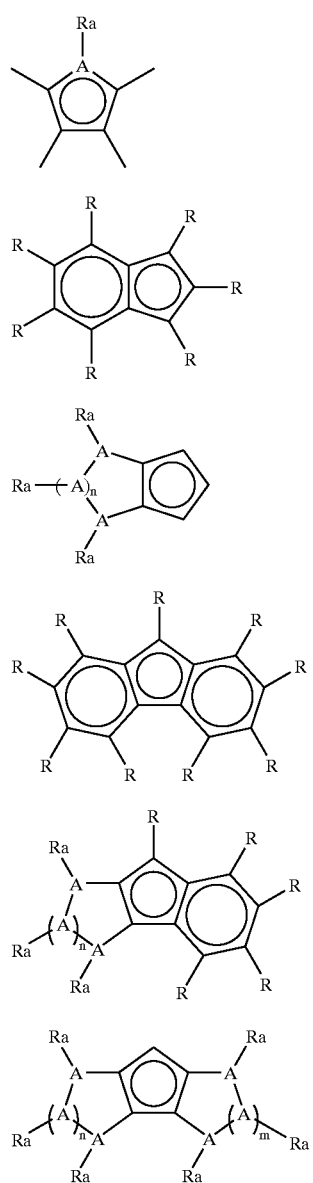

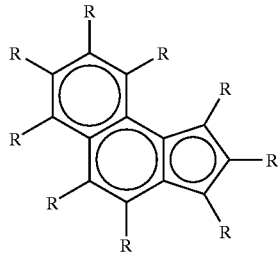

in which A represents an element of Group 13, 14, 15 or 16 of the Periodic Table, and plural A's may be the same or different; R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkyl-silyl or akylsilylalkyl group having from 3 to 30 carbon atoms, and R's may be the same or different, and may be optionally bonded to each other to form a cyclic structure; a represents 0, 1 or 2; and n and m each represent an integer of at least 14. A method for producing styrenic polymers, which comprises polymerizing styrenes in the presence of the polymerization catalyst of any of above 1 to 13.

15. The method of above 14 for producing styrenic polymers essentially having a syndiotactic structure.

BEST MODES OF CARRYING OUT THE INVENTION

The invention is described below with reference to its embodiments.

I. Catalyst for Polymerization of Styrenes

1. Components of Catalyst for Polymerization of Styrenes:

The catalyst of the invention for polymerization of styrenes comprises (A) a transition metal compound, (B) an oxygen-containing compound and/or a compound capable of reacting with a transition metal compound to form an ionic complex, and (C) a compound of formula (1) which will be described in detail hereinunder, and optionally (D) an alkylating agent. The constituent components are described below.

(A) Transition Metal Compound:

Various types of transition metal compounds are usable as the component (A) in the invention, but preferred are transition metal compounds of Groups 4 to 6 of the Periodic Table, or transition metal compounds of Groups 8 to 10 thereof. As the transition metal compounds of Groups 4 to 6 of the Periodic Table, preferred are those of the following general formulae (2) to (5). As the transition metal compounds of Groups 8 to 10 of the Periodic Table, preferred are those of the following general formula (6).

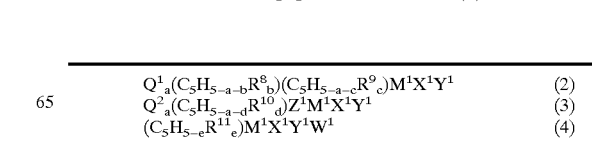

$$M^1X^1Y^1W^1U^1 \quad (5)$$
$$L^1L^2M^2X^1Y^1 \quad (6)$$

wherein $Q^1$ represents a bonding group that crosslinks the two conjugated five-membered cyclic ligands $(C_5H_{5-a-b}R^8{}_b)$ and $(C_5H_{5-a-c}R^9{}_c)$; $Q^2$ represents a bonding group that crosslinks the conjugated five-membered cyclic ligand $(C_5H_{5-a-d}R^{10}{}_d)$ and the group $Z^1$; $R^8$, $R^9$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 of the Periodic Table; $M^2$ represents a transition metal of Groups 8 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^1$, $L^2$, $X^1$, $Y^1$, $Z^1$, $W^1$ and $U^1$ may be bonded to each other to form a cyclic structure.

Specific examples of $Q^1$ and $Q^2$ in formulae (2) and (3) include (1) an alkylene group having from 1 to 4 carbon atoms, or a cycloalkylene group, or the group substituted by a lower alkyl or phenyl group at its side chain, such as a methylene group, an ethylene group, an isopropylene group, a methylphenylmethylene group, a diphenylmethylene group, a cyclohexylene group, etc.; (2) a silylene group, or an oligosilylene group, or the group substituted by a lower alkyl or phenyl group at its side chain, such as a silylene group, a dimethylsilylene group, a methylphenylsilylene group, a diphenylsilylene group, a disilylene group, a tetramethyldisilylene group, etc.; and (3) a hydrocarbon group (e.g., a lower alkyl group, a phenyl group, a hydrocarbyloxy group (preferably, a lower alkoxy group), etc.) containing germanium, phosphorus, nitrogen, boron or aluminium, such as a $(CH_3)_2Ge$ group, a $(C_6H_5)_2Ge$ group, a $(CH_3)P$ group, a $(C_6H_5)P$ group, a $(C_4H_9)N$ group, a $(C_6H_5)N$ group, a $(CH_3)B$ group, a $(C_4H_9)B$ group, a $(C_6H_5)B$ group, a $(C_6H_5)Al$ group, a $(CH_3O)Al$ group, etc. Of those, preferred are alkylene groups and silylene groups.

$(C_5H_{5-a-b}R^8{}_b)$, $(C_5H_{5-a-c}R^9{}_c)$ and $(C_5H_{5-a-d}R^{10}{}_d)$ are conjugated, 5-membered cyclic ligands, in which $R^8$, $R^9$ and $R^{10}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; a represents 0, 1 or 2; and b, c and d each represent an integer of from 0 to 5 when a=0, or an integer of from 0 to 4 when a=1, or an integer of from 0 to 3 when a=2. The hydrocarbon group preferably has from 1 to 20 carbon atoms, more preferably from 1 to 12 carbon atoms. The hydrocarbon group may be a monovalent one that bonds to the cyclopentadienyl group of a conjugated, 5-membered cyclic group. Two of plural hydrocarbon groups, if any, may be bonded to each other to form a cyclic structure along with a part of the cyclopentadienyl group. Specific examples of those conjugated, 5-membered cyclic ligands are substituted or unsubstituted cyclopentadienyl groups, indenyl groups and fluorenyl groups. The halogen atom includes chlorine, bromine, iodine and fluorine atoms. The alkoxy group preferably has from 1 to 12 carbon atoms. The silicon-containing hydrocarbon group includes, for example, groups of $-Si(R^{12})(R^{13})(R^{14})$, in which $R^{12}$, $R^{13}$ and $R^{14}$ each represent a hydrocarbon group having from 1 to 24 carbon atoms. As the phosphorus-containing hydrocarbon group, the nitrogen-containing hydrocarbon group and the boron-containing hydrocarbon group, for example, mentioned are groups of $-P(R^{15})(R^{16})$, $-N(R^{15})(R^{16})$, and $-B(R^{15})(R^{16})$, respectively, in which $R^{15}$ and $R^{16}$ each represent a hydrocarbon group having from 1 to 18 carbon atoms. Plural $R^8$'s, $R^9$'s and $R^{10}$'s, if any, may be the same or different ones, respectively. In formula (2), the conjugated, 5-membered cyclic ligands $(C_5H_{5-a-b}R^8{}_b)$ and $(C_5H_{5-a-c}R^9{}_c)$ may be the same or different ones.

$M^1$ represents a transition metal element of Groups 4 to 6 of the Periodic Table, including, for example, titanium, zirconium, hafnium, niobium, molybdenum, tungsten, etc. Of those, preferred are titanium, zirconium and hafnium, and more preferred is titanium. $Z^1$ represents a covalent-bonding ligand, including, for example, oxygen (—O—), sulfur (—S—), an alkoxy group having from 1 to 20, preferably from 1 to 10 carbon atoms, a thioalkoxy group having from 1 to 20, preferably from 1 to 12 carbon atoms, a nitrogen-containing hydrocarbon group having from 1 to 40, preferably from 1 to 18 carbon atoms, and a phosphorus-containing hydrocarbon group having from 1 to 40, preferably from 1 to 18 carbon atoms. $X^1$ and $Y^1$ each represent a covalent-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^1$ and $Y^1$ may be the same or different, and they may be bonded to each other to form a cyclic structure.

In formula (4), $M^1$ represents a transition metal of a Groups 4 to 6 of the Periodic Table, such as that mentioned above; and $X^1$ and $Y^1$ have the same meanings as above. The tog meanings of $X^1$ and $Y^1$ shall apply to $W^1$. Namely, $W^1$ is a covalent-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^1$, $Y^1$ and $W^1$ may be the same or different, and they may be bonded to each other to form a cyclic structure.

$(C_5H_{5-0}R^{11}{}_e)$ is a conjugated, 5-membered cyclic ligand, in which $R^{11}$ represents a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; e represents an integer of from 0 to 5. The hydrocarbon group preferably has from 1 to 20 carbon atoms, more preferably from 1 to 12 carbon atoms. The hydrocarbon group may be a monovalent one that bonds to the cyclopentadienyl group of a conjugated, 5-membered cyclic group. Two of plural hydrocarbon groups, if any, may be bonded to each other to form a cyclic structure along with a part of the cyclopentadienyl group. Specific examples of the conjugated, 5-membered cyclic ligand are substituted or unsubstituted cyclopentadienyl groups, indenyl groups and fluorenyl groups. The halogen atom includes chlorine, bromine, iodine and fluorine atoms. The alkoxy group preferably has from 1 to 12 carbon atoms. The silicon-containing hydrocarbon group includes, for example, groups of —Si($R^{12}$)($R^{13}$)($R^{14}$), in which $R^{12}$, $R^{13}$ and $R^{14}$ each represent a hydrocarbon group having from 1 to 24 carbon atoms. As the phosphorus-containing hydrocarbon group, the nitrogen-containing hydrocarbon group and the boron-containing hydrocarbon group, for example, mentioned are groups of —P($R^{15}$)($R^{16}$), —N($R^{15}$)($R^{16}$), and —B($R^{15}$)($R^{16}$), respectively, in which $R^{15}$ and $R^{16}$ each represent a hydrocarbon group having from 1 to 18 carbon atoms. Plural $R^{11}$'s, if any, may be the same or different.

In formula (5), $M^1$ represents a transition metal of Groups 4 to 6 of the Periodic Table, such as that mentioned above; and $X^1$, $Y^1$ and $W^1$ have the same meanings as above. The meanings of $X^1$, $Y^1$ and $W^1$ shall apply to $U^1$. Namely, $U^1$ is a covalent-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^1$, $Y^1$, $W^1$ and $U^1$ may be the same or different, and they may be bonded to each other to form a cyclic structure.

(I) As specific examples of the transition metal compounds of formulae (2) and (3), mentioned are the following compounds.

(1) Transition metal compounds not having a crosslinkable bonding group but having two conjugated, 5-membered cyclic ligands, such as bis(cyclopentadienyl)titanium dichloride, bis(methylcyclopentadienyl)titanium dichloride, bis(dimethylcyclopentadienyl)titanium dichloride, bis(trimethylcyclopentadienyl)titanium dichloride, bis(tetramethylcyclopentadienyl)titanium dichloride, bis(pentamethylcyclopentadienyl)titanium dichloride, bis(n-butylcyclopentadienyl)titanium dichloride, bis(indenyl)titanium dichloride, bis(fluorenyl)titanium dichloride, bis(cyclopentadienyl)titanium chlorohydride, bis(cyclopentadienyl)methyltitanium chloride, bis(cyclopentadienyl)ethyltitanium chloride, bis(cyclopentadienyl)phenyltitanium chloride, bis(cyclopentadienyl)dimethyltitanium, bis(cyclopentadienyl)diphenyltitanium, bis(cyclopentadienyl)dineopentyltitanium, bis(cyclopentadienyl)dihydrotitanium, (cyclopentadienyl)tindenyl)titanium dichloride (cyclopentadienyl)(fluorenyl)titanium dichloride, etc.

(2) Transition metal compounds having two conjugated, 5-membered cyclic ligands, in which the two ligands are crosslinked with an alkylene group, such as methylenebis(indenyl)titanium dichloride, ethylenebis(indenyl)titanium dichloride, methylenebis(indenyl)titanium chlorohydride, ethylenebis(indenyl)methyltitanium chloride, ethylenebis(indenyl)methoxychlorotitanium, ethylenebis(indenyl)titanium diethoxide, ethylenebis(indenyl)dimethyltitanium, ethylenebis(4,5,6,7-tetrahydroindenyl)titanium dichloride, ethylenebis(2-methylindenyl)titanium dichloride, ethylenebis(2,4-dimethylindenyl)titanium dichloride, ethylenebis(2-methyl-4-trimethylsilylindenyl)titanium dichioride, ethylenebis(2,4-dimethyl-5,6,7-trihydroindenyl)titanium dichloride, ethylene(2,4-dimethylcyclopentadienyl)(3',5'-dimethylcyclopentadienyl)titanium dichloride, ethylene(2-methyl-4-t-butylcyclopentadienyl)(3'-t-butyl-5'-methylcyclopentadienyl)titanium dichloride, ethylene(2,3,5-trimethylcyclopentadienyl)(2',4',5'-trimethylcyclopentadienyl)titanium dichloride, isopropylidenebis(2-methylindenyl)titanium dichloride, isopropylidenebis(indenyl)titanium dichloride, isopropylidenebis(2,4-dimethylindenyl)titanium dichloride, isopropylidene(2,4-dimethylcyclopentadienyl)(3',5'-dimethylcyclopentadienyl)titanium dichloride, isopropylidene(2-methyl-4-t-butylcyclopentadienyl)(3'-t-butyl-5'-methylcyclopentadienyl)titanium dichloride, methylene(cyclopentadienyl)(3,4-dimethylcyclopentadienyl)titanium dichloride, methylene(cyclopentadienyl)(3,4-dimethylcyclopentadienyl)titanium chlorohydride, methylene(cyclopentadienyl)(3,4-dimethylcyclopentadienyl)dimethyltitanium, methylene(cyclopentadienyl)(3,4-dimethylcyclopentadienyl)diphenyltitanium, methylene(cyclopentadienyl)(trimethylcyclopentadienyl)-titanium dichloride, methylene(cyclopentadienyl)(tetramethylcyclopentadienyl)-titanium dichloride, isopropylidene(cyclopentadienyl) (3,4-dimethylcyclopentadienyl)titanium dichloride, isopropylidene(cyclopentadienyl)(2,3,4,5-tetramethylcyclopentadienyl)titanium dichloride, isopropylidene(cyclopentadienyl)(3-methylindenyl)titanium dichloride, isopropylidene(cyclopentadienyl)(fluorenyl)titanium dichloride, isopropylidene(2-methylcyclopentadienyl)(fluorenyl)titanium dichloride, isopropylidene(2,5-dimethylcyclopentadienyl)(3,4-dimethylcyclopentadienyl)titanium dichloride, isopropylidene(2,5-dimethylcyclopentadienyl)(fluorenyl)titanium dichloride, ethylene(cyclopentadienyl)(3,5-dimethylcyclopentadienyl)titanium dichloride, ethylene(cyclopentadienyl)(fluorenyl)titanium dichloride, ethylene(2,5-dimethylcyclopentadienyl)(fluorenyl)titanium dichloride, ethylene(2,5-diethylcyclopentadienyl)(fluorenyl)titanium dichloride, diphenylmethylene(cyclopentadienyl)(3,4-diethylcyclopentadienyl)titanium dichloride, diphenylmethylene(cyclopentadienyl)(3,4-diethylcyclopentadienyl)titanium dichloride, cyclohexylidene(cyclopentadienyl)(fluorenyl)titanium dichloride, cyclohexylidene(2,5-dimethylcyclopentadienyl)(3',4'-dimethylcyclopentadienyl)titanium dichloride, etc. (3) Transition metal compounds having two silylene-crosslinked, conjugated, 5-membered cyclic ligands, such as dimethylsilylenebis(indenyl)titanium dichloride, dimethylsilylenebis(4,5,6,7-tetrahydroindenyl)titanium dichloride, dimethylsilylenebis(2-methylindeihyl)titanium dichloride, dimethylsilylenebis(2,4-dimethylindenyl)titanium dichloride, dimethylsilylenebis(2,4-dimethylcyclopentadienyl)(3',5'-dimethylcyclopentadienyl)titanium dichloride, phenylmethylsilylenebis(indenyl)titanium dichloride, phenylmethylsilylenebis(4,5,6,7-tetrahydroindenyl)titanium dichloride, phenylmethylsilylenebis(2,4-dimethylindenyl)titanium dichloride, phenylmethylsilylene(2,4- dimethylcyclopentadienyl)(3',5'-dimethylcyclopentadienyl) titanium dichloride, phenylmethylsilylene(2,3,5-trimethylaycyclopentadienyl)(2',4',5'-trimethylcyclopentadienyl)titanium dichloride, phenylmethylsilylenebis(tetramethylcyclopentadienyl)-titanium dichloride, diphenylsilylenebis(2,4-dimethylindenyl)titanium dichloride, diphenylsilylenebis(indenyl)titanium dichloride, diphenylsilylenebis(2-methylindenyl)titanium dichloride, tetramethyldisilylenebis(indenyl)titanium dichloride, tetramethyldisilylenebis(cyclopentadienyl)titanium dichloride, tetramethyldisilylene(3-methylcyclopentadienyl)(indenyl)titanium dichloride, dimethylsilylene(cyclopentadienyl)(3,4-dimethylcyclopentadienyl)titanium dichloride, dimethylsilylene-(cyclopentadienyl)(trimethylcyclopentadienyl)titanium dichloride, dimethylsilylene-(cyclopentadienyl)(tetramethylcyclopentadienyl)titanium dichloride, dimethylsilylene(cyclopentadienyl)(3,4-diethylcyclopentadieny)titanium dichloride, dimethylsilylene-(cyclopentadienyl)(triethylcyclopentadienyl)titanium dichloride, dimethylsilylene-(cyclopentadienyl)(tetraethylcyclopentadienyl)titanium dichloride, dimethylsilylene(cyclopentadienyl)(fluorenyl)titanium dichloride, dimethylsilylene(cyclopentadienyl)(2,7-di-t-butylfluorenyl)titanium dichloride, dimethylsilylene-(cyclopentadienyl)(octahydrofluorenyl)titanium dichloride, dimethylsilylene(2-methylcyclopentadienyl)(fluorenyl)titanium dichloride, dimethylsilylene(2,5-dimethylcyclopentadienyl)(fluorenyl)titanium dichloride, dimethylsilylene(2-ethylcyclopentadienyl)(fluorenyl)titanium dichloride, dimethylsilylene(2,5-diethylcyclopentadienyl)(fluorenyl)titanium dichloride, diethylsilylene(2-methylcyclopentadienyl)(2,7'-di-t-butylfluorenyl)titanium dichloride, dimethylsilylene(2,5-dimethylcyclopentadienyl)(2',7'-di-t-butylfluorenyl)titanium dichloride, dimethylsilylene(2-ethylcyclopentadienyl)(2',7'-di-t-butylfluorenyl)titanium dichloride, dimethylsilylene(diethylcyclopentadienyl)(2,7-di-t-butylfluorenyl)titanium dichloride, dimethylsilylene-(methylcyclopentadienyl)(octahydrofluorenyl)titanium dichloride, dimethylsilylene-(dimethylcyclopentadienyl)(octahydrofluorenyl)titanium dichloride, dimethylsilylene-(ethylcyclopentadienyl)(octahydrofluorenyl)titanium dichloride, dimethylsilylene-(diethylcyclopentadienyl)(octahydrofluorenyl)titanium dichloride, etc.

(4) Transition metal compounds having two conjugated, 5-membered cyclic ligands, in which the two ligands are crosslinked with a germanium-, aluminium-, boron-, phosphorus- or nitrogen-containing hydrocarbon group, such as dimethylgermylenebis(indenyl)titanium dichloride, dimethylgermylene(cyclopentadienyl)(fluorenyl)titanium dichloride, methylalumylenebis(indenyl)titanium dichloride, phenylamylenebis(indenyl)titanium dichloride, phenylphosphylenebis(indenyl)titanium dichloride, ethylborylenebis(indenyl)titanium dichloride, phenylamylenebis(indenyl)titanium dichloride, phenylamylene(cyclopentadienyl)(fluorenyl)titanium dichloride, etc.

(5) Transition metal compounds having one conjugated, 5-membered cyclic ligand, such as pentamethylcyclopentadienyl-bis(phenyl)aminotitanium dichloride, indenyl-bis(phenyl)aminotitanium dichloride, pentamethylcyclopentadienyl-bis(trimethylsilyl) aminotitanium dichloride, pentamethylcyclopentadienylphenoxytitanium dichloride, dimethylsilylene (tetramethylcyclopentadienyl)-phenylaminotitanium dichloride, dimethylsilylene(tetramethylcyclopentadienyl)-t-butylaminotitanium dichloride, dimethylsilylene (tetrahydroindenyl)decylaminotitanium dichloride, dimethylsilylene(tetrahydroindenyl)-[bis(trimethylsilyl) amino]titanium dichloride, dimethylgermylene-(tetramethylcyclopentadienyl)phenylaminotitanium dichloride, etc.

(6) Transition metal compounds having two conjugated, 5-membered cyclic ligands in which the ligands are double-crosslinked, such as (1,1'-dimethylsilylene)(2,2'-isopropylene)bis(cyclopentadienyl)titanium dichloride, (1,1'-dimethylsilylene)(2,2'-dimethylsilylene)-bis (cyclopentadienyl)titanium dichloride, (1,1'-dimethylsilylene)(2,2'-isopropylidene)-bis (cyclopentadienyl)dimethyltitanium, (1,1'-dimethylsilylene) (2,2'-isopropylidene)-bis(cyclopentadienyl) dibenzyltitanium, (1,1'-dimethylsilylene)(2,2'-isopropylidene)-bis(cyclopentadienyl)bis(trimethylsilyl) titanium, (1,1'-dimethylsilylene)(2,2'-isopropylidene)-bis (cyclopentadienyl)bis(trimethylsilylmethyl)titanium, (1,2'-dimethylsilylene)(2,1'-ethylene)-bis(indenyl)titanium dichloride, (1,1'-dimethylsilylene)(2,2'-ethylene)-bis (indenyl)titanium dichloride, (1,1'-ethylene)(2,2'-dimethylsilylene)-bis(indenyl)titanium dichloride, (1,1'-dimethylsilylene)(2,2'-cyclohexylidene)-tri bis(indenyl) titanium dichloride, etc.

(7) Derivatives from compounds of (1) to (6) noted above, which are produced by substituting the chlorine atoms in those compounds of (1) to (6) with any of a bromine atom, an iodine atom, a hydrogen atom, a methyl group, a phenyl group and others, and by substituting the center metal, titanium in those transition metal compounds with any of zirconium, hafnium, niobium, molybdenum, tungsten and others.

(8) In the above-mentioned compounds of (1) to (7), transition metal compounds having one conjugated five-membered cyclic ligand of (5) are used as a preferred catalyst component for producing styrenic polymers essentially having a syndiotactic structure.

(II) As specific examples of the transition metal compounds of formula (4), mentioned are the following compounds.

They are transition metal compounds of formula (4), in which the group $(C_5H_{5-e}R^{11}_e)$ is any of the following formulae (I) to (VII):

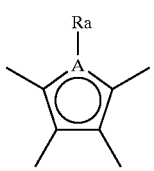

(I)

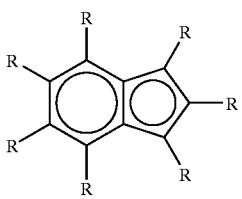

(II)

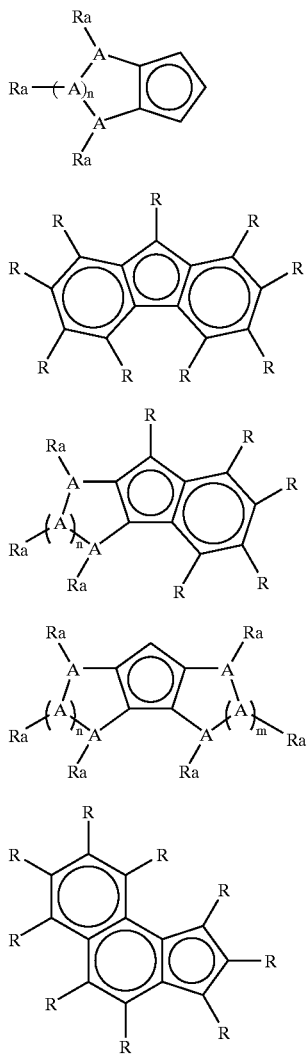

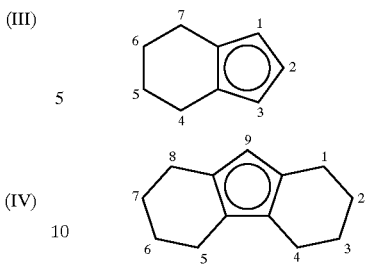

wherein A represents an element of Group 13, 14, 15 or 16 of the Periodic Table, and plural A's may be the same or different; R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or akylsilylalkyl group having from 3 to 30 carbon atoms, and R's may be the same or different, and may be optionally bonded to each other to form a cyclic structure; a represents 0, 1 or 2; and n and m each represent an integer of at least 1.

Specific examples of the group $(C_5H_{5-e}R^{11}_e)$ are mentioned below.

In the indenyl derivatives and the fluorenyl derivatives, the position of each substituent is indicated by the following position numbers.

The group $(C_5H_{5-e}R^{11}_e)$ includes, for example, a cyclopentadienyl group, a methylcyclopentadienyl group, a 1,2-dimethylcyclopentadienyl group, a 1,3-dimethylcyclopentadienyl group, a 1,2,3-trimethylcyclopentadienyl group, a 1,3,4-trimethylcyclopentadienyl group, a tetramethylcyclopentadienyl group, a pentamethylcyclopentadienyl group, an ethylcyclopentadienyl group, a 1,2-diethylcyclopentadienyl group, a 1,3-diethylcyclopentadienyl group, a 1,2,3-triethylcyclopentadienyl group, a 1,3,4-triethylcyclopentadienyl group, a tetraethylcyclopentadienyl group, a pentaethylcyclopentadienyl group, an indenyl group, a 1-methylindenyl group, a 1,2-dimethylindenyl group, a 1,3-dimethylindenyl group, a 1,2,3-trimethylindenyl group, a 2-methylindenyl group, a 1-ethylindenyl group, a 1-ethyl-2-methylindenyl group, a 1-ethyl-3-methylindenyl group, a 1-ethyl-2,3-dimethylindenyl group, a 1,2-diethylindenyl group, a 1,3-diethylindenyl group, a 1,2,3-triethylindenyl group, a 2-ethylindenyl group, a 1-methyl-2-ethylindenyl group, a 1,3-dimethyl-2-ethylindenyl group, a 4,5,6,7-tetrahydroindenyl group, a 1-methyl-4,5,6,7-tetrahydroindenyl group, a 1,2-dimethyl-4,5,6,7-tetrahydroindenyl group, a 1,3-dimethyl-4,5,6,7-tetrahydroindenyl group, a 1,2,3-trimethyl-4,5,6,7-tetrahydroindenyl group, a 2-methyl-4,5,6,7-tetrahydroindenyl group, a 1-ethyl-4,5,6,7-tetrahydroindenyl group, a 1-ethyl-2-methyl-4,5,6,7-tetrahydroindenyl group, a 1-ethyl-3-methyl-4,5,6,7-tetrahydroindenyl group, a 1-ethyl-2,3-dimethyl-4,5,6,7-tetrahydroindenyl group, a 1,2-diethyl-4,5,6,7-tetrahydroindenyl group, a 1,2-diethyl-3-methyl-4,5,6,7-tetrahydroindenyl group, a 1,3-diethyl-4,5,6,7-tetrahydroindenyl group, a 1,3-diethyl-2-methyl-4,5,6,7-tetrahydroindenyl group, a 1,2,3-triethyl-4,5,6,7-tetrahydroindenyl group, a 2-ethyl-4,5,6,7-tetrahydroindenyl group, a 1-methyl-2-ethyl-4,5,6,7-tetrahydroindenyl group, a 1,3-dimethyl-2-ethyl-4,5,6,7-tetrahydroindenyl group, a fluorenyl group, a 9-methylfluorenyl group, a 9-ethylfluorenyl group, a 1,2,3,4-tetrahydrofluorenyl group, a 9-methyl-1,2,3,4-tetrahydrofluorenyl group, a 9-ethyl-1,2,3,4-tetrahydrofluorenyl group, a 1,2,3,4,5,6,7,8-octahydrofluorenyl group, a 9-methyl-1,2,3,4,5,6,7,8-octahydrofluorenyl group, a 9-ethyl-1,2,3,4,5,6,7,8-octahydrofluorenyl group, etc.

Specific examples of the transition metal compounds of formula (4) are mentioned below.

They are cyclopentadienyltitanium trichloride, cyclopentadienyltitaniumtrimethyl, cyclopenadienyltitanium trimethoxide, cyclopentadienyltitaniumtribenzyl, methylcyclopentadienyltitanium trichloride, methylcyclopentadienyltitaniumtrimethyl, methylcyclopentadienyltitanium trimethoxide, methylcyclopentadienyltitaniumtribenzyl, dimethylcyclopentadienyltitanium trichloride, dimethylcyclopentadienyltitaniumtrimethyl, dimethylcyclopentadienyltitanium trimethoxide, dimethylcyclopentadienyltitaniumtribenzyl, trimethylcyclopentadienyltitaniumt trirthcide trimethylcyclopentadienyltitanium trimethoxide, trimethylcyclopentadienyltitaniumtribenzyl, tetramethylcyclopentadienyltitanium trichloride, tetramethylcyclopentadienyltitaniumtrimethyl, tetramethylcyclopentadienyltitanium trimethoxide, tetramethylcyclopentadienyltitaniumtribenzyl, pentamethylcyclopentadienyltitanium trichloride, pentamethylcyclopentadienylti taniumtrimethyl pentamethylcyclopentadienyltitanium trimethoxide, pentamethylcyclopentadienyltitaniumtribenzyl, indenyltitanium trichloride, indenyltitaniumtrimethyl, indenyltitanium trimethoxide, indenyltitaniumtribenzyl, 1-methylindenyltitanium trichloride, 1-methylindenyltitaniumtrimethyl, 1-methylindenyltitanium trimethoxide, 1-methylindenyltitaniumtribenzyl, 2-methylindenyltitanium trichloride, 2-methylindenyltitaniumtrimethyl, 2-methylindenyltitanium trimethoxide, -1-methylindenyltitaniumtribenzyl, 1,2-dimethylindenyltitanium trichloride, 1,2-dimethylindenyltitaniumtrimethyl, 1,2-dimethylindenyltitanium trimethoxide, 1,2-dimethylindenyltitaniumtribenzyl, 1,3-dimethylindenyltitanium trichloride, 1,3-dimethylindenyltitanium trimhloxide, 1,3-dimnethylindenyltitaniumtribenzyl, 1,2,3-trimethylindenyltitanium trichloride, 1,2,3-trimethylindenyltitaniumtrimethyl, 1,2,3-trimethylindenyltitanium trimethoxide, 1,2,3-trimethylindenyltitaniumtribenzyl, 1,2,3,4,5,6,7-heptarmethylindenyltitanium trichloride, 1,2,3,4,5,6,7-heptamethylindenyltitaniumtrimethyl, 1,2,3,4,5,6,7-heptamethylindenyltitanium trimethoxide, 1,2,3,4,5,6,7-heptamethylindenyltitaniumtribenzyl, 4,5,6,7-tetrahydroindenyltitanium trichloride, 4,5,6,7-tetrahydroindenyltitaniumtrimethyl, 4,5,6,7-tetrahydroindenyltitanium trimethoxide, 4,5,6,7-tetrahydroindenyltitanium tribenzyl, 1-methyl-4,5,6,7-tetrahydroindenyltitanium trichloride, 1-methyl-4,5,6,7-tetrahydroindenyltitaniumtrimethyl, 1-methyl-4,5,6,7-tetrahydroindenyltitanium trimethoxide, 1-methyl-4,5,6,7-tetrahydroindenyltitaniumtribenzyl, 2-methyl-4,5,6,7-tetrahydroindenyltitanium trichloride, 2-methyl-4,5,6,7-tetrahydroindenyltitaniumtrimethyl, 2-methyl-4,5,6,7-tetrahydroindenyltitanium trimethoxide, 2-methyl-4,5,6,7-tetrahydroindenyltitaniumtribenzyl, 1,2-dimethyl-4,5,6,7-tetrahydroindenyltitanium trichloride, 1,2-dimethyl-4,5,6,7-tetrahydroindenyltitaniumtrimethyl, 1,2-dimethyl-4,5,6,7-tetrahydroindenyltitanium trimethoxide, 1,2-dimethyl-4,5,6,7-tetrahydroindenyltitaniumtribenzyl, 1,3-dimethyl-4,5,6,7-tetrahydroindenyltitanium tricloride, 1,3-dimethyl-4,5,6,7-tetrahydroindenyltitaniumtrimethyl, 1,3-dimethyl-4,5,6,7-tetrahydroindenyltitanium trimethoxide, 1,3-dimethyl-4,5,6,7-tetrahydroindenyltitaniumtribenzyl, 1,2,3-trimethyl-4,5,6,7-tetrahydroindenyltitaniumtribenzyl, 1,2,3-trimethyl-4,5,6,7-tetrahydroindenyltitaniumtrimethyl, 1,2,3-trimethyl-4,5,6,7-tetrahydroindenyltitanium trimethoxide, 1,2,3-trimethyl-4,5,6,7-tetrahydroindenyltitaniumtribenzyl, 1-ethyl-4,5,6,7-tetrahydroindenyltitanium trichloride, 1-ethyl-4,5,6,7-tetrahydroindenyltitaniumtrimethyl, 1-ethyl-4,5,6,7-tetrahydroindenyltitanium trimethoxide, 1-ethyl-4,5,6,7-tetrahydroindenyltitaniumtribenzyl, 1-ethyl-2-methyl-4,5,6,7-tetrahydroindenyltitanium trichloride, 1-ethyl-2-methyl-4,5,6,7-tetrahydroindenyltitaniumtrimethyl, 1-ethyl-2-methyl-4,5,6,7-tetrahydroindenyltitanium trimethoxide, 1-ethyl-2-methyl-4,5,6,7-tetrahydroindenyltitaniumtribenzyl, 1-ethyl-3-methyl-4,5,6,7-tetrahydroindenyltitanium trichloride, 1-ethyl-3-methyl-4,5,6,7-tetrahydroindenyltitanium trichloride, 1-ethyl-3-methyl-4,5,6,7-tetrahydroindenyltitaniumtrimethyl, 1-ethyl-3-methyl-4,5,6,7-tetrahydroindenyltitanium trimethoxide, 1-ethyl-3-methyl-4,5,6,7-tetrahydroindenyltitaniumtribenzyl, 1-ethyl-2,3-dimethyl-4,5,6,7-tetrahydroindenyltitanium trichloride, 1-ethyl-2,3-dimethyl-4,5,6,7-tetrahydroindenyltitaniumtrimethyl, 1-ethyl-2,3-dimethyl-4,5,6,7-tetrahydroindenyltitanium trimethoxide, 1-ethyl-2,3-dimethyl-4,5,6,7-tetrahydroindenyltitaniumtribenzyl, 1 2-diethyl-4,5,6,7-tetrahydroindenyltitanium trichloride, 1,2-diethyl-4,5,6,7-tetrahydroindenyltitaniumtrimethyl, 1,2-diethyl-4,5,6,7-tetrahydroindenyltitanium trimethoxide, 1,2-diethyl-4,5,6,7-tetrahydroindenyltitaniumtribenzyl, 1,2-diethyl-3-methyl-4,5,6,7-tetrahydroindenyltitanium trichloride, 1,2-diethyl-3-methyl-4,5,6,7-tetrahydroindenyltitaniumtrimethyl, 1,2-diethyl-3-methyl-4,5,6,7-tetrahydroindenyltitanium trimethoxide, 1,2-diethyl-3-methyl-4,5,6,7-tetrahydroindenyltitaniumtribenzyl, 1,3-diethyl-4,5,6,7-tetrahydroindenyltitanium trichloride, 1,3-diethyl-4,5,6,7-tetrahydroindenyltitaniumtrimethyl 1,3-diethyl-4,5,6,7-tetrahydroindenyltitanium trimethoxide, 1,3-diethyl-4,5,6,7-tetrahydroindenyltitaniumtribenzyl, 1,3-diethyl-2-methyl-4,5,6,7-tetrahydroindenyltitanium trichloride, 1,3-diethyl-2-methyl-4,5,6,7-tetrahydroindenyltitaniumtrimethyl, 1,3-diethyl-2-methyl-4,5,6,7-tetrahydroindenyltitanium trimethoxide, 1,3-diethyl-2-methyl-4,5,6,7-tetrahydroindenyltitaniumtribenzyl, 1,2,3-triethyl-4,5,6,7-tetrahydroindenyltitanium trichloride, 1,2,3-triethyl-4,5,6,7-tetrahydroindenyltitaniumtrimethyl, 1,2,3-triethyl-4,5,6,7-tetrahydroindenyltitanium trimethoxide, 1,2,3-triethyl-4,5,6,7-tetrahydroindenyltitaniumtribenzyl, 2-ethyl-4,5,6,7-tetrahydroindenyltitanium trichloride, 2-ethyl-4,5,6,7-tetrahydroindenyltitaniumtrimethyl, 2-ethyl-4,5,6,7-tetrahydroindenyltitanium trimethoxide, 2-ethyl-4,5,6,7-tetrahydroindenyltitaniumtribenzyl, 1-methyl-2-ethyl-4,5,6,7-tetrahydroindenyltitanium trichloride, 1-methyl-2-ethyl-4,5,6,7-tetrahydroindenyltitaniumtrimethyl, 1-methyl-2-ethyl-4,5,6,7-tetrahydroindenyltitanium trimethoxide, 1-methyl-2-ethyl-4,5,6,7-tetrahydroindenyltitaniumtribenzyl, 1,3-dimethyl-2-ethyl-4,5,6,7-tetrahydroindenyltitanium trichloride, 1,3-dimethyl-2-ethyl-4,5,6,7-tetrahydroindenyltitaniumtrimethyl, 1,3-dimethyl-2-ethyl-4,5,6,7-tetrahydroindenyltitanium trimethoxide, 1,3-dimethyl-2-ethyl-4,5,6,7-tetrahydroindenyltitaniumtribenzyl, 1,2,3,4-tetrahydrofluorenyltitanium trichioride, 1,2,3,4-tetrahydrofluorenyltitaniumtrimethyl, 1,2,3,4-tetrahydrofluorenyltitanium trimethoxide, 1,2,3,4-tatrahydrofluorenyltitaniumtribenzyl, 9-methyl-1,2,3,4-tetrahydrofluorenyltitanium trichioride, 9-methyl-1,2,3,4-tetrahydrofluorenyltitaniumtrimethyl, 9-methyl-1,2,3,4-tetrahydrofluorenyltitanium trimethoxide, 9-methyl-1,2,3,4-tetrahydrofluorenyltitaniumtribenzyl, 9-ethyl-1,2,3,4-tetrahydrofluorenyltitanium trichloride, 9-ethyl-1,2,3,4-tetrahydrofluorenyltitaniu mtrimethyl, 9-ethyl-1,2,3,4-tetrahydrofluorenyltitanium trimethoxide, 9-ethyl-1,2,3,4-tetrahydrofluorenyltitaniumtribenzyl, 1,2,3,4,5,6,7,8-octahydrofluorenyltitanium trichloride, 1,2,3,4,5,6,7,8-octahydrofluorenyltitaniumtrim ethyl, 1,2,3,4,5,6,7,8-octahydrofluorenyltitanium trimethoxide, 1,2,3,4,5,6,7,8-octahydrofluorenyltitaniumtribenzyl, 9-methyl-1,2,3,4,5,6,7,8-octahydrofluorenyltitanium trichloride, 9-methyl-1,2,3,4,5,6,7,8-octahydrofluorenyltitaniumtrimethyl, 9-methyl-1,2,3,4,5,6,7,8-octahydrofluorenyltitanium trimethoxide, 9-ethyl-1,2,3,4,5,6,7,8-octahydrofluorenyltitanium trichloride, 9-ethyl-1,2,3,4,5,6,7,8-octahydrofluorenyltitaniumtrimethyl, 9-ethyl-1,2,3,4,5,6,7,8-octahydrofluorenyltitanium trimethoxide, 9-ethyl-1,2,3,4,5,6,7,8-octahydrofluorenyltitaniumtribenzyl, etc.; as well as their derivatives tobeproducedby substituting the titanium element in those compounds with zirconium or hafnium, or with any other element of different Groups, and also their analogues having a transition metal element of lanthanides. However, these are not limitative. Of these, preferred are titanium compounds.

(III) Specific Examples of the transition metal compounds of formula (5) include tetramethyltitanium, tetrabenzyltitanium, tetraethyltitanium, tetraphenyltitanium, tetramethoxytitanium, tetraethoxytitanium, tetrephenoxytitanium, tetra(dimethylamino)titanium, tetra(diethylamino)titanium, tetra(diphenylamino)titanium; bis(phenoxo)titanium compounds described in Macromolecules, 1997, 30, 1562–1569, in Journal of Organometallic Chemistry, 514 (1996), 213–217, etc.; diamidotitanium compounds described in Macromolecules, 1996, 29, 5241–5243, in Organometallics, 1997, 16, 1491–1496, etc.; their derivatives to be produced by substituting the titanium element in those compounds with zirconium or hafnium, or with any other element of different Groups, and also their analogues having a transition metal element of lanthanides.

(IV) In the transition metal compounds of formula (6), $M^2$ represents a transition metal of Groups 8 to 10 of the Periodic Table, concretely including iron, cobalt, nickel, palladium, platinum, etc. Of those, preferred are nickel and palladium. $L^1$ and $L^2$ each represents a coordination-bonding ligand; and $X^1$ and $Y^1$ each represent a covalent-bonding or ionic-bonding ligand. As mentioned hereinabove, $X^1$ and $Y^1$ include, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^1$ and $Y^1$ may be the same or different ones. Specific examples of $L^1$ and $L^2$ include triphenylphosphine, acetonitrile, benzonitrile, 1,2-bisdiphenylphosphinoethane, 1,3-bisdiphenylphosphinopropane, 1,1'-bisdiphenylphosphinoferrocene, cyclooctadiene, pyridine, bistrimethylsilylaminobistrimethylsilyliminophosphorane, etc.

$L^1$, $L^2$, $X^1$ and $Y^1$ may be bonded to each other to form a cyclic structure.

The compounds of transition metals of Groups 9 to 10 of the Periodic Table preferably have a diimine compound as the ligand, including, for example, complex compounds of a general formula (I-7):

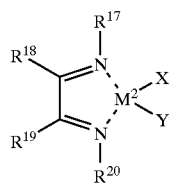
(7)

wherein $R^{17}$ and $R^{20}$ each independently represent an aliphatic hydrocarbon group having from 1 to 20 carbon atoms, or an aromatic group having a hydrocarbon group on the ring and having from 7 to 20 carbon atoms in total; $R^{18}$ and $R^{19}$ each independently represent a hydrogen atom, or a hydrocarbon group having from 1 to 20 carbon atoms, and $R^{18}$ and $R^{19}$ may be bonded to each other to form a ring; X and Y each independently represent a hydrogen atom, or a hydrocarbon group having from 1 to 20 carbon atoms; and $M^2$ represents a transition metal of Groups 8 to 10 of the Periodic Table.

In formula (7), the aliphatic hydrocarbon group having from 1 to 20 carbon atoms for $R^{17}$ and $R^{20}$ may be a linear or branched alkyl group having from 1 to 20 carbon atoms or a cycloalkyl group having from 3 to 20 carbon atoms, concretely including a methyl group, an ethyl group, an n-propyl group, an isopropyl group, an-n-butyl group, an isobutyl group, a sec-butyl group, a tert-butyl group, a pentyl group, a hexyl group, an octyl group, a decyl group, a tetradecyl group, a hexadecyl group, an octadecyl group, a cyclopentyl group, a cyclohexyl group, and a cyclooctyl group, etc. Into the ring of the cycloalkyl group, a suitable substituent such as a lower alkyl group or the like may be introduced. The aromatic group having a hydrocarbon group on the ring and having from 7 to 20 carbon atoms in total includes, for example, phenyl and naphthyl groups with at least one linear, branched or cyclic C1–10 alkyl group being on the aromatic ring. For $R^{17}$ and $R^{20}$, preferred is an aromatic group having a hydrocarbon group on the ring, and especially preferred is a 2,6-diisopropylphenyl group. $R^{17}$ and $R^{20}$ may be the same or different.

The hydrocarbon group having from 1 to 20 carbon atoms for $R^{18}$ and $R^{19}$ includes, for example, a linear or branched alkyl group having from 1 to 20 carbon atoms, a cycloalkyl group having from 3 to 20 carbon atoms, an aryl group having from 6 to 20 carbon atoms, and an aralkyl group having from 7 to 20 carbon atoms. For examples of the linear or branched alkyl group having from 1 to 20 carbon atoms and the cycloalkyl group having from 3 to 20 carbon atoms for $R^{18}$ and $R^{19}$, referred to are those of the C1–20 aliphatic hydrocarbon group mentioned hereinabove for $R^{17}$ and $R^{20}$. The aryl group having from 6 to 20 carbon atoms includes, for example, a phenyl group, a tolyl group, a xylyl group, a naphthyl group, a methylnaphthyl group, etc.; and the aralkyl group having from 7 to 20 carbon atoms includes, for example, a benzyl group, a phenethyl group, etc. $R^{18}$ and $R^{19}$ may be the same or different, and may be bonded to each other to form a ring.

For examples of the hydrocarbon group having from 1 to 20 carbon atoms for X and Y, referred to are those of the C1–20 hydrocarbon group mentioned hereinabove for $R^{18}$ and $R^{19}$. For X and Y, especially preferred is a methyl group. X and Y may be the same or different.

The transition metal of Groups 8 to 10 of the Periodic Table for $M^2$ includes, for example, nickel, palladium, platinum, iron, cobalt, rhodium, ruthenium, etc. Preferred are nickel and palladium.

Specific examples of the complex compounds of formula (7) are compounds of the following formulae [1], [2], [3], [4], [5], [6], [7], [8], [9], [10], [11] and [12].

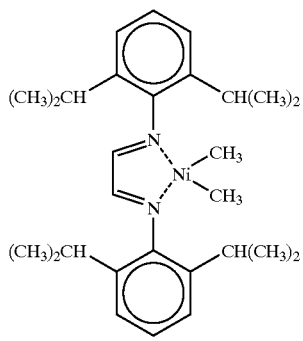
[1]
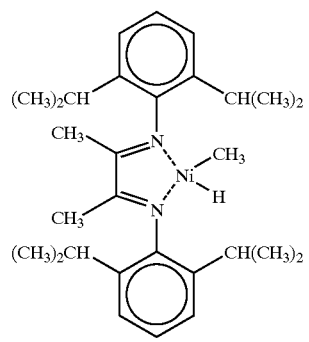
[5]
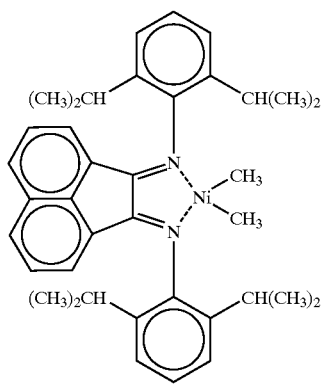
[2]
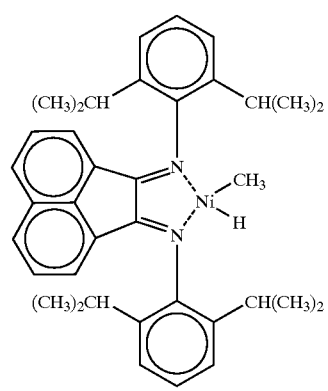
[6]
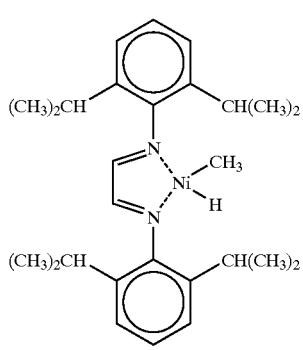
[3]
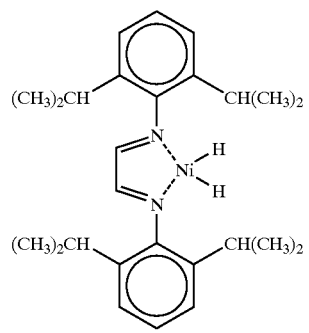
[7]
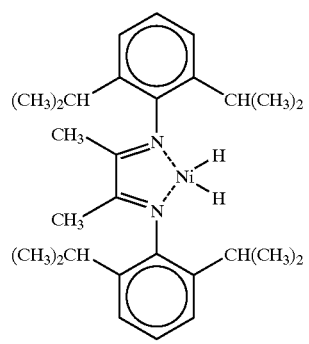
[4]
[8]

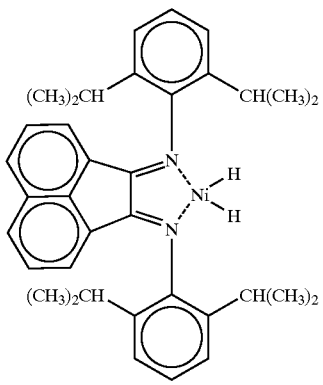

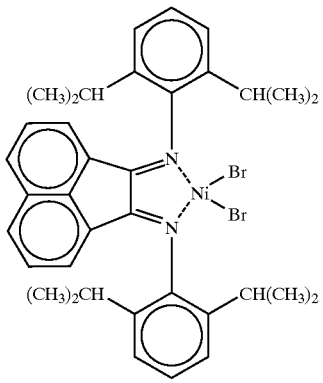

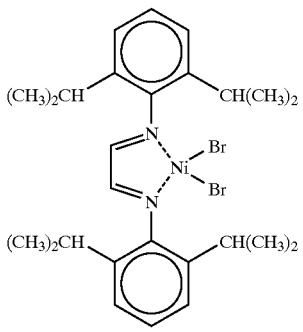

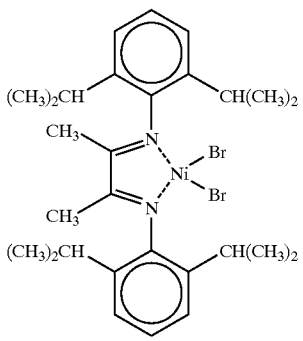

Specific examples of the transition metal compounds of formula (7) include dibromobistriphenylphosphine nickel, dichlorobistriphenylphosphine nickel, dibromodiacetonitrile nickel, dibromodibenzonitrile nickel, dibromo(1,2-bisdiphenylphosphinoethane)nickel, dibromo(1,3-bisdiphenylphosphinopropane)nickel, dibromo(1,1'-diphenylbisphosphinoferrocene)nickel, dimethylbisdiphenylphosphine nickel, dimethyl(1,2-bisdiphenylphosphinoethane)nickel, methyl(1,2-bisdiphenylphosphinoethano)nickel tetrafluoroborate, (2-diphenylphosphino-1-phenyle thyleneoxy) phenylpyridine nickel, dichlorobistriphenylphosphine palladium, dichlorodibenzonitrile palladium, dichlorodiacetonitrile palladium, dichloro(1,2-bisdiphenylphosphinoethane)palladium, bistriphenylphosphinopalladium bistetrafluoroborate, bis(2,2'-bipyridino)methyliron tetrafluoroborate etherate, etc.

Of those, preferred are cationic complexes such as methyl (1,2-bisdiphenylphosphinoethano)nickel tetrafluoroborate, bistriphenylphosphinopalladium bistetrafluoroborate, and bis(2,2'-bipyridino)methyliron tetrafluoroborate etherate.

In the invention, one or more of the complex compounds noted above may be used either singly or as combined.

Component (B):

(a) an oxygen-containing compound, and/or (b) a compound capable of reacting with a transition metal compound to form an ionic complex, preferably (a) an oxygen-containing compound.

In the invention, both a catalyst for copolymerization which comprises the component (B) as an essential component and a catalyst for copolymerization which does not comprise the component (B).

(a) Oxygen-containing Compound:

Herein used are oxygen-containing compounds of a general formula (8):

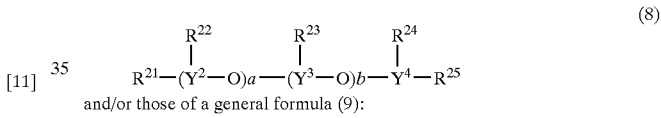

and/or those of a general formula (9):

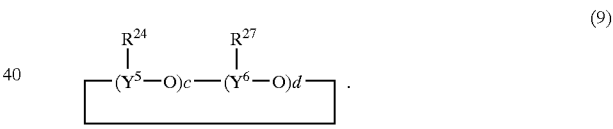

In formulae (8) and (9), $R^{21}$ to $R^{27}$ each represent an alkyl group having from 1 to 8 carbon atoms, concretely including a methyl group, an ethyl group, an n-propyl group, an isopropyl group, all types of butyl groups, all types of pentyl groups, all types of hexyl group, all types of heptyl groups, and all types of octyl groups. $R^{21}$ to $R^{25}$ may be the same or different; and $R^{26}$ and $R^{27}$ may be the same or different. $Y^2$ to $Y^6$ each represent an element of Group 13 of the Periodic Table, concretely including B, Al, Ga, In and Tl. Of these, preferred are B and Al. $Y^2$ to $Y^4$ may be the same or different; and $Y^5$ and $Y^6$ may be the same or different. a to d each indicates a number of from 0 to 50, but (a+b) and (c+d) each must be at least 1. a to d each preferably falls between 1 and 20, more preferably between 1 and 10, even more preferably between 1 and 5.

As the oxygen-containing compound for the catalyst component, preferred are alkylaluminoxanes. Preferred examples of the compound are methylaluminoxane and isobutylaluminoxane.

(b) Compound Capable of Reacting with a Transition Metal Compound to form an Ionic Complex:

The compound capable of reacting with a transition metal compound to form an ionic complex includes coordination complex compounds that comprise an anion with plural groups bonded to a metal, and a cation, and Lewis acids. Known are various coordination complex compounds that comprise an anion with plural groups bonded to a metal, and a cation. For example, compounds of the following general formula (10) or (11) are preferably used in the invention.

$$([L^3-H]^{g+})_h([M^3X^2X^3 \ldots X^n]^{(n-m)-})_i \quad (10)$$

$$([L^4]^{g+})_h([M^4X^2X^3 \ldots X^n]^{(n-m)-})_i \quad (11)$$

wherein $L^4$ indicates $M^5$, $R^{28}R^{29}M^6$ or $R^{30}{}_3C$, which will be mentioned hereinafter; $L^3$ represents a Lewis base; $M^3$ and $M^4$ each represent a metal selected from Group 5 to Group 15 of the Periodic Table; $M^5$ represents a metal selected from Group 1, and Group 8 to Group 12 of the Periodic Table; $M^6$ represents a metal selected from Group B to Group 10 of the Periodic Table; $X^2$ to $X^n$ each represent a hydrogen atom, a dialkylamino group, an alkoxy group, an aryloxy group, an alkyl group having from 1 to 20 carbon atoms, an aryl group having from 6 to 20 carbon atoms, an alkylaryl group, an arylalkyl group, a substituted alkyl group, an organometalloid group, or a halogen atom; $R^{28}$ and $R^{29}$ each represent a cyclopentadienyl group, a substituted cyclopentadienyl group, an indenyl group, or a fluorenyl group; $R^{30}$ represents an alkyl group or an aryl group; m indicates the valency of $M^3$ or $M^4$, and represents an integer of from 1 to 7; n represents an integer of from 2 to 8; g indicates the ion valency of $L^3$-H or $L^4$, and represents an integer of from 1 to 7; h represents an integer of 1 or more; and i=h×g/(n−m).

Specific examples of $M^3$ and $M^4$ include atoms of B, Al, Si, P, As, Sb, etc.; those of $M^5$ include atoms of Ag, Cu, Na, Li, etc.; and those of $M^6$ include atoms of Fe, Co, Ni, etc. Specific examples of $X^2$ to $X^n$ include a dimethylamino group, a diethylamino group, etc., as a dialkylamino group; a methoxy group, an ethoxy group, an n-butoxy group, etc., as an alkoxy group; a phenoxy group, a 2,6-dimethylphenoxy group, a naphthyloxy group, etc., as an aryloxy group; a methyl group, an ethyl group, an n-propyl group, an isopropyl group, an n-butyl group, an n-octyl group, a 2-ethylhexyl group, etc., as an alkyl group having from 1 to 20 carbon atoms; a phenyl group, a p-tolyl group, a benzyl group, a pentafluorophenyl group, a 3,5-di(trifluoromethyl)phenyl group, a 4-tert-butylphenyl group, a 2,6-dimethylphenyl group, a 3,5-dimethylphenyl group, a 2,4-dimethylphenyl group, a 1,2-dimethylphenyl group, etc., as an aryl group having from 6 to 20 carbon atoms, an alkylaryl group or an arylalkyl group; F, Cl, Br, I, as a halogen; and a pentamethylantimonyl group, a trimethylsilyl group, a trimethylgermyl group, a diphenylarsenyl group, a dicyclohexylantimonyl group, a diphenylboryl group, etc., as an organometalloid group. Specific examples of the substituted cyclopentadienyl group for $R^{28}$ and $R^{29}$ include a methylcyclopentadienyl group, a butylcyclopentadienyl group, a pentamethylcyclopentadienyl group, etc.

In the invention, concretely, the anion with plural groups bonded to a metal includes $B(C_6F_5)_4{}^-$, $B(C_6HF_4)_4{}^-$, $B(C_6H_2F_3)_4{}^-$, $B(C_6H_3F_2)_4{}^-$, $B(C_6H_4F)_4{}^-$, $B[C_6(CF_3)F_4]_4{}^-$, $B(C_6H_5)_4{}^-$, $PF_6{}^-$, $P(C_6F_5)_6{}^-$, $Al(C_6HF_4)_4{}^-$, etc. The cation includes, for example, $Cp_2Fe^+$, $(MeCp)_2Fe^+$, $(tBuCp)_2Fe^+$, $(Me_2Cp)_2Fe^+$, $(Me_3Cp)_2Fe^+$, $(Me_4Cp)_2Fe^+$, $(Me_5Cp)_2Fe^+$, $Ag^+$, $Na^+$, $Li^+$, etc. The other cations include, for example, those from nitrogen-containing compounds, such as pyridinium, 2,4-dinitro-N,N-diethylanilinium, diphenylammonium, p-nitroanilinium, 2,5-dichloroanilinium, p-nitro-N,N-dimethylanilinium, quinolinium, N,N-dimethylanilinium, N,N-diethylanilinium, etc.; those from carbenium compounds such as triphenylcarbenium, tri(4-methylphenyl)carbenium, tri (4-methoxyphenyl)carbenium, etc.; alkylphosphonium ions such as $CH_3PH_3{}^+$, $C_2H_5PH_3{}^+$, $C_3H_7PH_3{}^+$, $(CH_3)_2PH_2{}^+$, $(C_2H_5)_2PH_2{}^+$, $(C_3H_7)_2PH_2{}^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$, $(C_3H_7)_4P^+$, etc.; arylphosphonium ions such as $C_6H_5PH_3{}^+$, $(C_6H_5)_2PH_2{}^+$, $(C_6H_5)_3PH^+$, $(C_6H_5)_4P^+$, $(C_2H_5)_2(C_6H_5)PH^+$, $(CH_3)_2(C_6H_5)PH_2{}^+$, $(CH_3)_2(C_6H_5)PH^+$, $(C_2H_5)_2(C_6H_5)_2P^+$, etc.

Of the compounds of formulae (10) and (11), concretely, the following are especially preferred. Preferred examples of the compounds of formula (10) include triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium. hexafluoroarsenate, pyridinium tetrakis(pentafluorophenyl)borate, pyrrolinium tetra(pentafluorophenyl)borate, N,N-dimethylanilinium tetrakis(pentafluorophenyl)borate, methyldiphenylammonium tetrakis(pentafluorophenyl)borate, etc. Preferred examples of the compounds of formula (11) include ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, silver hexafluoroarsenate, silver hexafluoroantimonate, silver tetrafluoroborate, etc.

The Lewis acid includes, for example, $B(C_6F_5)_3$, $B(C_6HF_4)_3$, $B(C_6H_2F_3)_3$, $B(C_6H_3F_2)_3$, $B(C_6H_4F)_3$, $B(C_6H_5)_3$, $BF_3$, $B[C_6(CF_3)F_4]_3$, $PF_5$, $P(C_6F_5)_5$, $Al(C_6HF_4)_3$, etc.

Component (C):

This is a compound of the following general formula (1):

$$((R^1)_3-X-Y)n-Z-(R^2)m-n \quad (1)$$

wherein $R^1$ represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, or a carboxyl group , $R^1$'s may be the same or different, and $R^1$'s may be optionally bonded to each other to form a cyclic structure; X represents an element of Group 14; Y represents an element of Group 16; Z represents a metal element of Groups 2 to 13; $R^2$ represents a hydrocarbon group; m is an integer, indicating the valency of the metal element Z; and n is an integer of from 1 to (m−1), Especially preferred are the following compounds: (1) X is carbon, Y is oxygen and Z is aluminium; (2) at least one of three $R^1$'s is an aromatic hydrocarbon group having from 6 to 30 carbon atoms; (3) three $R^1$'s are all hydrocarbon groups each having at least one carbon atom; (4) three $R^1$'s are all aromatic hydrocarbon groups each having from 6 to 30 carbon atoms, preferably phenyl groups; (5) $R^2$ is an alkyl group having at least 2 carbon atoms.

Concretely, more preferred those where $R^1$'s are all phenyl groups, X is carbon, Y is oxygen, Z is aluminium, n=1, and $R^2$ is an isobutyl group.

The compounds for the component (C) are not specifically defined for their production method, so far as they have the structure of the formula mentioned above, but preferred are those produced by reacting <1> at least one selected from compounds of a general formula $(R^1)_3$—C—$R^3$, $R^4$—CO—$R^5$, or $R^6$—CO—$R^7$, with <2> a compound of a general formula, $Z(R^2)_m$. (In these formulae, $R^1$, Z, m or $R^2$ are same as described above. $R^1$ is a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms; $R^3$ is hydroxyl, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms; $R^4$ and $R^5$ each represents hydrogen, halogen, an aliphatic hydrocarbon group having from 1 to 30 carbon atoms or an aromatic hydrocarbon group having from 6 to 30 carbon atoms; $R^6$ is a hydrogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms or an amino group; and $R^7$ is hydroxy, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms or an amino group; and $R^1$ and $R^3$ or $R^4$ and $R^5$ or $R^6$ and $R^7$ may be optionally bonded to each other to from a cyclic structure.)

Concretely, they are reaction products of at least one selected from alcohols, ethers, aldehydes, ketones, carboxylic acids and carboxylates, with an aluminium compound. Preferred are reaction products of alcohols with an aluminium compound. For these, preferred are the following: (1) at least one of three $R^1$'s for $(R^1)_3$ is an aromatic hydrocarbon group having from 6 to 30 carbon atoms; (2) three $R^1$'s for $(R^1)3$ are all hydrocarbon groups each having at least one carbon atom; (3) three $R^1$'s for $(R^1)_3$ are all hydrocarbon groups each having from 4 to 30 carbon atoms; (4) three $R^1$'s for $(R^1)_3$ are all aromatic hydrocarbon groups each having from 6 to 30 carbon atoms, preferably phenyl groups; (5) $R^2$ is an alkyl group having at least 2 carbon atoms. Concretely, more preferred are those where $R^1$'s are all phenyl groups, and $R^2$ is an isobutyl group. Most preferred is a reaction product of triphenylmethyl alcohol with triisobutylaluminium.

The reaction condition for the compound <1> and the compound <2> is not specifically defined, but is preferably as follows: They are blended in a ratio by mol, compound <1>/compound <2> falling between 1/0.01 and 1/100, precisely between 1/0.1 and 1/10, or between 1/0.5 and 1/50, or between 1/0.8 and 1/10, or between 1/0.5 and 1/2, or between 1/0.8 and 1/1.2, but most preferably between 1/0.8 and 1/10. The reaction temperature falls between −60° C. and 300° C., more preferably between −10° C. and 5° C. The solvent for the reaction is not also specifically defined, but is preferably the same one as that for polymerization, such as toluene, ethyl benzene or the like.

In place of using the compound of the above-mentioned general formula as the component (C), a compound of the following (C1) and a compound of the following (C2) may be directly added to the site of catalyst production or to the site of copolymerization to form the component (C) in situ. In this case, the catalyst components are the transition metal compound (A), an oxygen-containing compound, and/or a compound capable of reacting with a transition metal to form an ionic complex(B), the compounds (C1) and (C2), and optionally an alkylating agent (D).

(C1) is at least one selected from compounds of a general formula $(R^1)_3$—C—$R^3$, $R^4$—CO—$R^5$, or $R^6$—CO—$R^7$, and (C2) is a compound of a general formula, $Z(R^2)_m$. In these formulae, $R^1$ is a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms; $R^3$ is hydroxyl, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms; $R^4$ and $R^5$ each represents hydrogen, halogen, an aliphatic hydrocarbon group having from 1 to 30 carbon atoms or an aromatic hydrocarbon group having from 6 to 30 carbon atoms; $R^6$ is a hydrogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms or an amino group; and $R^7$ is hydroxy, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms or an amino group; and $R^1$ and $R^3$ or $R^4$ and $R^5$ or $R^6$ and $R^7$ may be optionally bonded to each other to form a cyclic structure. Z represents a metal element of Group 2 to 13; m is an integer, indicating the valency of the metal element Z; and $R^2$ represents a hydrocarbon group.

Concretely, (C1) is at least one selected from alcohols, ethers, aldehydes, ketones, carboxylic acids and carboxylates, preferably from alcohols; and (C2) is an aluminium compound. For these, preferred are the following: (1) at least one of three $R^1$'s for $(R^1)_3$ is an aromatic hydrocarbon group having from 6 to 30 carbon atoms; (2) three $R^1$'s for $(R^1)_3$ are all hydrocarbon groups each having at least one carbon atom; (3) three $R^1$'s for $(R^1)_3$ are all aromatic hydrocarbon groups each having from 6 to 30 carbon atoms, preferably phenyl groups; (4) $R^2$ is an alkyl group having at least 2 carbon atoms. More concretely, the most preferred combination is (C1) of triphenylmethyl alcohol and (C2) of triisobutylaluminium.

(D) Alkylating Agent:

The catalyst of the invention for production of styrenic polymers optionally contains an alkylating agent. Various types of alkylating agents are known and are usable in the invention, including, for example, alkyl group-having aluminium compounds of a general formula (12):

$$R^{31}_m Al(OR^{32})_n X_{3-m-n} \qquad (12)$$

wherein $R^{31}$ and $R^{32}$ each represent an alkyl group having from 1 to 8, preferably from 1 to 4 carbon atoms; X represents a hydrogen atom or a halogen atom; $0<m\leq 3$, but preferably m is 2 or 3, most preferably 3; $0\leq n<3$, but preferably n is 0 or 1;

alkyl group-having magnesium compounds of a general formula (13):

$$R^{31}_2 Mg \qquad (13)$$

wherein R³¹ has the same meaning as above; and alkyl group-having zinc compounds of a general formula (14):

$$R^{31}{}_2Zn \quad (14)$$

wherein R³¹ has the same meaning as above.

Of these alkyl group-having compounds, preferred are alkyl group-having aluminium compounds; and more preferred are trialkylaluminium compound and dialkylaluminium compounds. Concretely, they include trialkylaluminiums such as trimethylaluminium, triethylaluminium, tri-n-propylaluminium, triisopropylaluminium, tri-n-butylaluminium, triisobutylaluminium, tri-t-butylaluminium, etc.; dialkylaluminium halides such as dimethylaluminium chloride, diethylaluminium chloride, di-n-propylaluminium chloride, diisopropylaluminium chloride, di-n-butylaluminium chloride, diisobutylaluminium chloride, di-t-butylaluminium chloride, etc.; dialkylaluminium alkoxides such as dimethylaluminium methoxide, dimethylaluminium ethoxide, etc.; dialkylaluminium hydrides such as dimethylaluminium hydride, diethylaluminium hydride, diisobutylaluminium hydride, etc. Further mentioned are dialkylmagnesiums such as dimethylmagnesium, diethylmagnesium, di-n-propylmagnesium, diisopropylmagnesium, etc.; dialkylzincs such as dimethylzinc, diethylzinc, di-n-propylethylzinc, diisopropylzinc, etc.

2. Method for Producing Catalyst:

(1) Order of Contacting Constituent Components:

To produce the catalyst of the invention, the order of contacting the constituent components with each other is not specifically defined. For example, the components may be contacted with each other in the following manner.

(i) For producing the catalyst comprising the component (A), the component (B) and the component (C), for example, employable is <1> a method of first contacting the component (A) with the component (B), followed by further contacting it with the component (C); <2> a method of first contacting the component (A) with the component (C) followed by further contacting it with the component (B); <3> a method of first contacting the component (B) with the component (C) followed by further contacting it with the component (A); or <4> a method of contacting the three components all together.

When the catalyst contains the optional component (D), the order of contacting the component (D) with the other components is not specifically defined. For example, in the process of producing the catalyst, the component (A) may be contacted with the component (D); or the component (B) may be contacted with the component (D); or the component (C) may be contacted with the component (D). As the case may be, the components (A), (B) and (D) are first contacted all together with each other and then with the component (C).

(ii) For producing the catalyst comprising the component (A), the component (B), the component (C1) and the component (C2), the order of contacting these components with each other is not also specifically defined, like in the case (i). Preferably, however, the component (C1) and the component (C2) are first contacted with each other prior to being contacted with the other components. The same as in the case (i) shall apply also to the case (ii) of producing the catalyst containing the optional component (D).

(iii) In the case of which does not use the component (B), the order of contacting these components with each other is the same as mentioned above.

(2) Blend Ratio of Constituent Components:

(i) In the Case of Using the Component (B):

<1> Regarding the ratio by mol of the component (A) to the component (B), referred to is a case where an organoaluminium compound is used as the oxygen-containing compound of the component (B). In that case, the molar ratio of the component (A) to the component (B) may fall between 1/1 and 1/10,000, but preferably between 1/10 and 1/1,000, in terms of the molar ratio to the aluminium atom in (B). Referred to is a case where a boron compound is used as a compound capable of reacting with a transition metal compound to form an ionic complex of the component (B). In that case, the molar ratio of the component (A) to the component (B) may fall between 1/0.5 and 1/10, but preferably between 1/0.8 and 1/5, in terms of the molar ratio to the boron atom in (B).

(ii) In the Both Cases of Using the Component (B) and not Using the Component (B):

<1> Regarding the ratio by mol of the component (A) to the component (C), referred to is a case where an aluminium compound is used as the component (C). In that case, the molar ratio of the component (A) to the component (C) may fall between 1/0.5 and 1/1,000, but more preferably between 1/1and 1/100, in terms of the molar ratio to the aluminium atom in (C). Regarding the ratio by mol of the component (A) to the component (D), referred to is a case where an aluminium compound is used as the component (D). In that case, the molar ratio of the component (A) to the component (D) may fall between 1/0.5 and 1/1,000, but preferably between 1/1 and 1/100, in terms of the molar ratio to the aluminium atom in (D).

<2> Where the catalysts contain a combination of the component (C1) and the component (C2), but not the component (C), the molar ratio of (C1) to (C2) may fall between 1/0.01 and 1/100, precisely between 1/0.1 and 1/10, or between 1/0.5 and 1/50, or between 1/0.8 and 1/10, or between 1/0.5 and 1/2, or between 1/0.8 and 1/1.2, but most preferably between 1/0.8 and 1/10. Regarding the ratio by mol of the component (A) to the component (C2), referred to is a case where an aluminium compound is used as the component (C2). In that case, the molar ratio of the component (A) to the component (C2) may fall between 1/0.5 and 1/10,000, precisely between 1/0.5 and 1/1,000, or between 1/1 and 1/1,000 or between 1/1 and 1/100, but most preferably between 1/1 and 1/1,000, in terms of the molar ratio to the aluminium atom in (C2). Regarding the blend ratio of the component (D), the same as in the case <1> shall apply also to the case <2>.

(3) Condition for Contacting Constituent Components:

To produce the catalysts, the constituent components may be contacted with each other in an inert atmosphere of nitrogen or the like, at a temperature not higher than the temperature at which the catalysts are used for polymerization. For example, they may be contacted with each other at a temperature falling between −30 and 200° C.

II. Method for Producing Styrenic Polymers

1. Monomers to be Polymerized:

In the method of the invention for producing styrenic polymers, used is the above-mentioned catalyst for polymerization of styrenes. The catalyst is favorable to homopolymerization of styrenes and to copolymerization of styrenes with other styrenes (that is, copolymerization of different types of styrenes).

Styrenes for the method are not specifically defined, including styrene; alkylstyrenes such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene, etc.; alkoxystyrenes such as p-methoxystyrene, o-methoxystyrene, m-methoxystyrene, etc.; halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, etc.; as well as trimethylsilylstyrene, vinylbenzoates, divinylbenzene, etc.

Of the styrenes mentioned above, preferred are styrene, alkylstyrenes and divinylbenzene. More preferred are styrene, α-methylstyrene, p-methylstyrene and divinylbenzene.

In the invention, one or more styrenes such as those, mentioned above may be (co)polymerized in any desired combination.

2. Polymerization Condition:

In the invention, the polymerization catalyst may be subjected to pre-polymerization. For pre-polymerization, a small amount of styrenes may be contacted with the catalyst, for which the method is not specifically defined but may be any ordinary one. Styrenes for pre-polymerization are not also specifically defined, and may be any of those mentioned above. The pre-polymerization temperature may fall generally between −20 and 200° C., but preferably between −1° C. and 130° C. As the solvent for pre-polymerization, usable are inactive hydrocarbons, aliphatic hydrocarbons, aromatic hydrocarbons, monomers, etc.

The method for polymerizing styrenes is not specifically defined and may be any ordinary one including, for example, slurry polymerization, solution polymerization, vapor-phase polymerization, bulk polymerization, suspension polymerization, etc. In the method, the order of contacting the catalyst components with monomers is not also specifically defined. One embodiment comprises contacting the catalyst components with each other to prepare a catalyst in advance in the manner mentioned above, followed by applying monomers to the catalyst batch. Another comprises putting the catalyst components and monomers into a polymerization reactor in any desired order. In this, the catalyst components are not previously blended to prepare a catalyst in advance. Preferably, the components except the component (C) or except the components (C1) and (C2), or that is, the components (A), (B) and (D) are blended in a reactor, while, on the other hand, monomers are blended with the component (C) or with the components (C1) and (C2) in a different reactor, and the two blends in different reactors are mixed just before the start of polymerization of the monomers. Having been thus blended, the monomers begin to polymerize in the presence of the catalyst formed in situ.

For the polymerization, a solvent may be used. The solvent includes hydrocarbons and halogenohydrocarbons such as benzene, toluene, ethylbenzene, n-hexane, n-heptane, cyclohexane, methylene chloride, chloroform, 1,2-dichloroethane, chlorobenzene, etc. One or more of these compounds may be used either singly or as combined for the solvent. Depending on their type, the monomers to be polymerized could serve as a polymerization solvent.

The amount of the catalyst to be used for the polymerization is preferably so controlled that the component (A) may fall generally between 0.1 and 500 μmols, but preferably between 0.5 and 100 μmols, relative to one mol of the monomers to be polymerized, in view of the polymerization activity and the reactor efficiency.

Regarding the polymerization condition, the pressure may fall generally between normal pressure and 196 MPaG. The reaction temperature may fall generally between −50 and 150° C. For controlling the molecular weight of the polymer to be produced, the type and the amount of the catalyst components to be used and the polymerization temperature shall be suitably controlled, or hydrogen may be introduced into the polymerization system.

3. Styrenic Polymers:

Styrenic polymers to be obtained by polymerizing styrenes in the presence of the catalyst mentioned above could have a high-degree syndiotactic structure in their styrene chain moieties. The high-degree syndiotactic structure referred to herein for the styrene chain moiety in the styrenic polymers produced is meant to indicate that the stereochemical structure of the styrenic polymers has a high degree of syndiotacticity, in which the side chains of phenyl groups or substituted phenyl groups are positioned alternately in the opposite sites relative to the main chain composed of carbon-carbon bonds. The degree of tacticity of the polymers may be determined through nuclear magnetic resonance with an isotopic carbon ($^{13}$C-NMR). The degree of tacticity to be determined through $^{13}$C-NMR is represented by the ratio of continuous plural constituent units existing in polymers. For example, diad indicates 2 units; triad indicates 3 units; and pentad indicates 5 units. The "styrenic polymers having a syndiotactic structure" as referred to herein are meant to include polystyrenes, poly(substituted styrenes) and poly(vinylbenzoates) all having a degree of syndiotacticity of such that the racemidiad proportion is not smaller than 75%, preferably not smaller than 85%, or the racemipentad proportion is not smaller than 30%, preferably not smaller than 50%, as well as their mixtures, and copolymers consisting essentially of such styrenic polymers.

The poly(substituted styrenes) include poly(hydrocarbon-substituted styrenes) such as poly(methylstyrenes), poly(ethylstyrenes), poly(isopropylstyrenes), poly(tert-butylstyrenes), poly(phenylstyrenes), poly(vinylstyrenes), etc.; poly(halogenostyrenes) such as poly(chlorostyrenes), poly(bromostyrenes), poly(fluorostyrenes), etc.; poly(alkoxystyrenes) such as poly(methoxystyrenes), poly(ethoxystyrenes), etc. Of those styrenic polymers, especially preferred are polystyrene, poly (p-methylstyrene), poly(m-methylstyrene), poly(p-tert-butylstyrene), poly(p-chlorostyrene), poly(m-chlorostyrene), and poly(p-fluorostyrene).

In addition, they further include copolymers of styrene and p-methylstyrene; copolymers of styrene and p-tert-butylstyrene; copolymers of styrene and divinylbenzene, etc.

EXAMPLES

The invention is described more concretely with reference to the following Examples, which, however, are not intended to restrict the scope of the invention.

Example 1

(1) Preparation of Component (C):

0.875 ml of a toluene solution of triisobutylaluminium (2 mols/liter) was added to a toluene solution of 455 mg (1.75 mmols) of triphenylmethanol at −78° C., and stirred at room temperature for 24 hours. The concentration of the component (C) thus formed was 0.1 mols/liter.

Through $^1$H-NMR, the product was confirmed to have the component (C), diisobutyltriphenylmethoxyaluminium formed therein.

(2) Mixing of Catalyst Components for Polymer Production:

Nitrogen was introduced into a 50 ml container, to which were added 23.9 ml of toluene, 0.38 ml of a toluene solution of triisobutylaluminium (2 mols/liter), 1.05 ml of a toluene solution of methylaluminoxane (1.43 mols/liter), and 0.120 ml of a toluene solution of 1,2,3,4,5,6,7,8-octahydrofluorenyltitanium trimethoxide (250 mmols/liter), to prepare a mixed solution of catalyst components.

(3) Polymerization of Styrene:

50 ml of styrene and 0.20 ml of the component (C) prepared in (1) were put into a 300 ml flask, of which the inner temperature was then kept at 70° C. Next, 1.25 ml of the mixed solution of catalyst components prepared in (2) was added thereto. In that condition, the monomer was polymerized for 1 hour at 70° C., the polymer thus produced was taken out, washed with methanol and dried. Its yield was 31.3 g. This was subjected to Soxhlet extraction with tetrahydrofuran (THF) for 4 hours to obtain 29.6 g of syndiotactic polystyrene (SPS). The catalyst activity to SPS, in terms of 1 g of Ti of the titanium compound applied to the polymerization system, was 412 (kg/g-Ti). Through GPC, the weight-average molecular weight of SPS thus obtained was measured, and it was 420,000.

Comparative Example 1

(1) Mixing of Catalyst Components for Polymer Production:
This is the same as in (2) in Example 1.
(2) Polymerization of Styrene:

In the same manner as in (3) in Example 1, styrene was polymerized to obtain 13.2 g of a polymer. In this, however, the component (C) prepared in (1) in Example 1 was not added to the polymerization system. After extracted with THF, the product gave 13.0 g of SPS. The catalyst activity to SPS, in terms of 1 g of Ti of the titanium compound applied to the polymerization system, was 181 (kg/g-Ti). Through GPC, the weight-average molecular weight of SPS obtained herein was measured, and it was 450,000.

Example 2

(1) Mixing of Catalyst Components for Polymer Production:

In the same manner as in (2) in Example 1, a mixed solution of catalyst components was prepared. In this, however, used was 0.12 ml of a toluene solution of pentamethylcyclopentadienyltitanium trimethoxide (250 mmols/liter) and not 0.120 ml of the toluene solution of 1,2,3,4,5,6,7,8-octahydrofluorenyltitanium trimethoxide (250 mmols/liter).

(2) Polymerization:

50 ml of styrene and 0.20 ml of the component (C) prepared in (1) in Example 1 were put into a 300 ml flask, of which the inner temperature was then kept at 70° C. Next, 1.25 ml of the mixed solution of catalyst components prepared in the above step (1) was added thereto. In that condition, the monomer was polymerized for 1 hour at 70° C., and then processed in the same manner as in (3) in Example 1 to produce a polymer. Its yield was 13.21 g. This was subjected to Soxhlet extraction with THF to obtain 12.11 g of SPS. Through GPC the weight-average molecular weight of SPS was 1,500,000; and the catalyst activity was 169 kg/g-Ti.

Comparative Example 2

Styrene was polymerized and post-treated in the same manner as in (2) in Example 2 to produce a polymer. In this, however, the component (C) was not added to the polymerization system. The yield of the polymer produced herein was 9.21 g. The polymer was subjected to Soxhlet extraction with THF to obtain 9.11 g of SPS. Through GPC the weight-average molecular weight of SPS was 1,500,000; and the catalyst activity was 127 kg/g-Ti.

Example 3

(1) Mixing of Catalyst Components for Polymer Production:

40 ml of toluene, 0.50 ml of a toluene solution of triisobutylaluminium (2 mols/liter), 38 mg of dimethylanilinium tetrakispentafluorophenyl borate, and 0.160 ml of a toluene solution of pentamethylcyclopentadienyltitanium trimethoxide (250 mmols/liter) were mixed in a 50 ml container to prepare a mixed solution of catalyst components.

(2) Polymerization:

In the same manner as in (3) in Example 1, styrene was polymerized and post-treated to obtain 7.84 g of a polymer. In this, however, used was 1.25 ml of the mixed solution of catalyst components prepared in the above step (1) and not 1.25 ml of the mixed solution of catalyst components prepared in (2) in Example 1. The polymer was subjected to Soxhlet extraction with THF to obtain 7.46 g of SPS. Through GPC, the weight-average molecular weight of SPS obtained herein was measured, and it was 1,300,000. The catalyst activity was 104 kg/g-Ti.

Comparative Example 3

Styrene was polymerized and post-treated in the same manner as in (2) in Example 3 to produce a polymer. In this, however, the component (C) was not added to the polymerization system. The yield of the polymer produced herein was 5.96 g. The polymer was subjected to Soxhlet extraction with THF to obtain 5.87 g of SPS. Through GPC the weight-average molecular weight of SPS was 1,500,000; and the catalyst activity was 82 kg/g-Ti.

Example 4

The same process as in Example 1 was repeated. In this, however, the amount of triisobutylaluminium used in the step (1) was 4.375 ml and not 0.875 ml; and the amount of the component (C) used in the step (3) was 4 ml and not 0.20 ml. The data to obtained herein are given in Table 1.

Example 5

The same process as in Example 1 was repeated. In this, however, the amount of triisobutylaluminium used in the step (1) was 1.05 ml and not 0.875 ml; and 1-methyltrimethylsilyl-2-methyl-4,5,6,7-tetrahydroindenyltitanium trimethoxide and not 1,2,3,4,5,6,7,8-octahydrofluorenyltitanium trimethoxide was used in the step (2). The data obtained herein are given in Table 1.

Comparative Example 4

The same process as in Example 5 was repeated. In this, however, the component (C) was not used. The data obtained herein are given in Table 1.

Example 6

The same process as in Example 5 was repeated. In this, however, used was methyldimethylaminopentamethylcyclopentadienyltitanium trimethoxide and not 1-methyltrimethylsilyl-2-methyl-4,5,6,7-tetrahydroindenyltitanium trimethoxide. The data obtained herein are given in Table 1.

Comparative Example 5

The same process as in Example 6 was repeated. In this, however, the component (C) was not used. The data obtained herein are given in Table 1.

Example 7

The same process as in Example 5 was repeated. In this, however, used was 2,2-t-butyl-4,4-methylthiobisphenoxytitanium dichloride and not 1-methyltrimethylsilyl-2-methyl-4,5,6,7-tetrahydroindenyltitanium trimethoxide. The data obtained herein are given in Table 1.

Comparative Example 6

The same process as in Example 7 was repeated. In this, however, the component (C) was not used. The data obtained herein are given in Table 1.

Example 8

The same process as in Example 5 was repeated. In this, however, used was 2-methyl-4,5,6,7-tetrahydroindenyltitanium trimethoxide and not 1-methyltrimethylsilyl-2-methyl-4,5,6,7-tetrahydroindenyltitanium trimethoxide. The data obtained herein are given in Table 1.

Comparative Example 7

The same process as in Example 8 was repeated. In this, however, the component (C) was not used. The data obtained herein are given in Table 1.

Example 9

The same process as in Example 5 was repeated. In this, however, used was 4,5,6,7-tetrahydroindenyltitanium trimethoxide and not 1-methyltrimethylsilyl-2-methyl-4,5,6,7-tetrahydroindenyltitanium trimethoxide. The data obtained herein are given in Table 1.

Comparative Example 8

The same process as in Example 9 was repeated. In this, however, the component (C) was not used. The data obtained herein are given in Table 1.

TABLE 1-1

|  | Component (A) | Component (B) | Component (C1) | Component (C2) |
|---|---|---|---|---|
| Example 1 | 1,2,3,4,5,6,7,8-octahydrofluorenyl-titanium trimethoxide | MAO[1] | Ph$_3$COH | TIBA[3] |
| Comp. Ex. 1 | 1,2,3,4,5,6,7,8-octahydrofluorenyl-titanium trimethoxide | MAO[1] | — | — |
| Example 2 | pentamethylcyclopentadienyl-titanium trimethoxide | MAO[1] | Ph$_3$COH | TIBA[3] |
| Comp. Ex. 2 | pentamethylcyclopentadienyl-titanium trimethoxide | MAO[1] | — | — |
| Example 3 | pentamethylcyclopentadienyl-titanium trimethoxide | boron compound[2] | Ph$_3$COH | TIBA[3] |
| Comp. Ex. 3 | pentamethylcyclopentadienyl-titanium trimethoxide | boron compound[2] | — | — |
| Example 4 | 1,2,3,4,5,6,7,8-octahydrofluorenyl-titanium trimethoxide | MAO[1] | Ph$_3$COH | TIBA[3] |
| Example 5 | 1-methyltrimethylsilyl-2-methyl-4,5,6,7-tetrahydroindenyltitanium trimethoxide | MAO[1] | Ph$_3$COH | TIBA[3] |
| Comp. Ex. 4 | 1-methyltrimethylsilyl-2-methyl-4,5,6,7-tetrahydroindenyltitanium trimethoxide | MAO[1] | — | — |
| Example 6 | methyldimethylaminopentamethylcyclo-pentadienyltitanium trimethoxide | MAO[1] | Ph$_3$COH | TIBA[3] |
| Comp. Ex. 5 | methyldimethylaminopentamethylcyclo-pentadienyltitanium trimethoxide | MAO[1] | — | — |
| Example 7 | 2,2-t-butyl-4,4-methylthiobisphen-oxytitanium dichloride | MAO[1] | Ph$_3$COH | TIBA[3] |
| Comp. Ex. 6 | 2,2-t-butyl-4,4-methylthiobisphen-oxytitanium dichloride | MAO[1] | — | — |
| Example 8 | 2-methyl-4,5,6,7-tetrahydroindenyl-titanium trimethoxide | MAO[1] | Ph$_3$COH | TIBA[3] |
| Comp. Ex. 7 | 2-methyl-4,5,6,7-tetrahydroindenyl-titanium trimethoxide | MAO[1] | — | — |
| Example 9 | 4,5,6,7-tetrahydroindenyl-titanium trimethoxide | MAO[1] | Ph$_3$COH | TIBA[3] |
| Comp. Ex. 8 | 4,5,6,7-tetrahydroindenyl-titanium trimethoxide | MAO[1] | — | — |

[1]MAO: methylaluminoxane
[2]boron compound: dimethylanilinium tetrakispentafluorophenyl borate
[3]TIBA: triisobutylaluminium

TABLE 1-2

|  | (C1)/(C2) (mol/mol) | Amount of Component (C) applied to polymerization system (ml) | Yield of Polymer (g) | Weight of Polymer after THF extraction (g) | Activity (kg/g-Ti) | Molecular Weight ($\times 10^{-4}$) |
|---|---|---|---|---|---|---|
| Example 1 | 1/1 | 0.2 | 31.3 | 29.6 | 412 | 42 |
| Comp. Ex. 1 | — | — | 13.2 | 13.0 | 181 | 45 |
| Example 2 | 1/1 | 0.2 | 13.2 | 12.1 | 169 | 150 |
| Comp. Ex. 2 | — | — | 9.2 | 9.1 | 127 | 150 |

TABLE 1-2-continued

| | (C1)/(C2) (mol/mol) | Amount of Component (C) applied to polymerization system (ml) | Yield of Polymer (g) | Weight of Polymer after THF extraction (g) | Activity (kg/g-Ti) | Molecular Weight (×10⁻⁴) |
|---|---|---|---|---|---|---|
| Example 3 | 1/1 | 0.2 | 7.8 | 7.5 | 104 | 130 |
| Comp. Ex. 3 | — | — | 6.0 | 5.9 | 82 | 150 |
| Example 4 | 1/5 | 4 | 36.3 | 35.9 | 500 | 41 |
| Example 5 | 1/1.2 | 0.2 | 10.4 | 9.9 | 138 | 39 |
| Comp. Ex. 4 | — | — | 5.7 | 5.2 | 72 | 40 |
| Example 6 | 1/1.2 | 0.2 | 7.2 | 6.9 | 96 | 24 |
| Comp. Ex. 5 | — | — | 3.5 | 3.1 | 43 | 22 |
| Example 7 | 1/1.2 | 0.2 | 2.6 | 2.1 | 29 | 46 |
| Comp. Ex. 6 | — | — | 1.4 | 1.2 | 17 | 47 |
| Example 8 | 1/1.2 | 0.2 | 32.4 | 32.0 | 445 | 32 |
| Comp. Ex. 7 | — | — | 10.8 | 10.2 | 142 | 30 |
| Example 9 | 1/1.2 | 0.2 | 33.7 | 32.9 | 458 | 10 |
| Comp. Ex. 8 | — | — | 9.2 | 8.7 | 121 | 11 |

Industrial Applicability

The catalysts for styrene polymerization of the invention enable efficient and inexpensive production of styrenic polymers essentially having a syndiotactic structure.

What is claimed is:

1. A method for producing styrenic polymers, which comprises:
   polymerizing styrenes in the presence of a polymerization catalyst, which comprises:
   (A) a transition metal compound,
   (B) an oxygen-containing compound and/or a compound capable of reacting with a transition metal compound to form an ionic complex,
   (C) a compound which is a reaction product of <1> at least one compound selected from the group of compounds consisting of formulae $(R^1)_3$—C—$R^3$, $R^4$—CO—$R^5$ and $R^6$—CO—$R^7$, and <2> a compound of formula, $Al(R^2)_3$:
   in which $R^1$ is a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms; $R^3$ is hydroxyl, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms; $R^4$ and $R^5$ each represents hydrogen, halogen, an aliphatic hydrocarbon group having from 1 to 30 carbon atoms or an aromatic hydrocarbon group having from 6 to 30 carbon atoms, $R^6$ is a hydrogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms or an amino group; and $R^7$ is hydroxy, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms; or an amino group; and $R^1$, and $R^3$ or $R^4$ and $R^5$ or $R^6$ and $R^7$ may be optionally bonded to each other to form a cyclic structure; and $R^2$ represents a hydrocarbon group;

and optionally,
   (D) an alkylating agent.

2. The method as claimed in claim 1, wherein $R^2$ is an alkyl group having at least 2 carbon atoms.

3. The method as claimed in claim 1, wherein the transition metal compound (A) is represented by any of the following formulae (2) to (6):

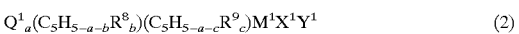

$$Q^1{}_a(C_5H_{5-a-b}R^8{}_b)(C_5H_{5-a-c}R^9{}_c)M^1X^1Y^1 \quad (2)$$

$$Q^2{}_a(C_5H_{5-a-d}R^{10}{}_d)Z^1M^1X^1Y^1 \quad (3)$$

$$(C_5H_{5-e}R^{11}{}_e)\,M^1X^1Y^1W^1 \quad (4)$$

$$M^1X^1Y^1W^1U^1 \quad (5)$$

$$L^1L^2M^2X^1Y^1 \quad (6)$$

in which $Q^1$ represents a bonding group that crosslinks the two conjugated five-membered cyclic ligands $(C_5H_{5-a-b}R^8{}_b)$ and $(C_5H_{5-a-c}R^9{}_c)$; $Q^2$ represents a bonding group that crosslinks the conjugated five-membered cyclic ligand $(C_5H_{5-a-d}d^{10}{}_d)$ and the group $Z^1$; $R^8$, $R^9$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 of the Periodic Table; $M^2$ represents a transition metal of Groups 8 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^1$, $L^2$, $X^1$, $Y^1$, $W^1$ and $U^1$ may be bonded to each other to form a cyclic structure.

4. The method as claimed in claim 3, wherein, in the transition metal compound (A) of formula (4), the group $(C_5H_{5-e}R^{11}{}_e)$ is represented by any of the following formulae (I) to (VII)

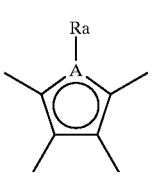

(I)

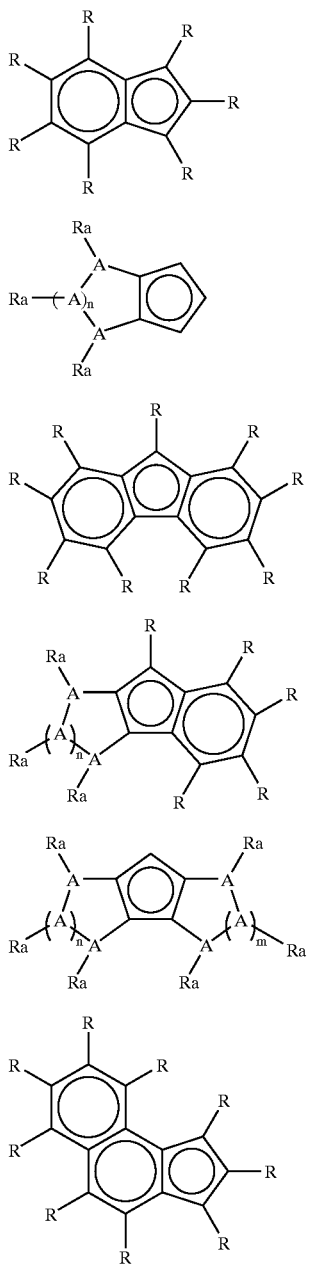

in which A represents an element of Group 13, 14, 15 or 16 of the Periodic Table, and plural A's may be the same or different; R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and may be optionally bonded to each other to form a cyclic structure; a represents 0, 1 or 2; and n and m each represent an integer of at least 1.

5. The method as claimed in claim 1, which is for producing styrenic polymers essentially having a syndiotactic structure.

6. A method for producing styrenic polymers, which comprises:
polymerizing styrenes in the presence of a polymerization catalyst, which comprises:
(A) a transition metal compound,
(C) a compound which is a reaction product of <1> at least one compound selected from the group of compounds consisting of formulae $(R^1)_3$—C—$R^3$, $R^4$—CO—$R^5$, and $R^6$—CO—$R^7$, and <2> a compound of formula, $Al(R^2)_3$:
in which $R^1$ is a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms; $R^3$ is hydroxyl, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms; $R^4$ and $R^5$ each represents hydrogen, halogen, an aliphatic hydrocarbon group having from 1 to 30 carbon atoms or an aromatic hydrocarbon group having from 6 to 30 carbon atoms; $R^6$ is a hydrogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms or an amino group; and $R^7$ is hydroxy, an alkoxy group having from 1 to 30 carbon atoms, an aryloxy group having from 6 to 30 carbon atoms, a thioalkoxy group having from 1 to 30 carbon atoms, or a thioaryloxy group having from 6 to 30 carbon atoms; or an amino group; and $R^1$ and $R^3$ or $R^4$ and $R^5$ or $R^6$ and $R^1$ may be optionally bonded to each other to form a cyclic structure; and $R^2$ represents a hydrocarbon group;
and optionally,
(D) an alkylating agent.

7. The method as claimed in claim 6, wherein $R^2$ is an alkyl group having at least 2 carbon atoms.

8. The method as claimed in claim 6, wherein the transition metal compound (A) is represented by any of the following formulae (2) to (6):

| | |
|---|---|
| $Q^1_a(C_5H_{5-a-b}R^8_b)(C_5H_{5-a-c}R^9_c)M^1X^1Y^1$ | (2) |
| $Q^2_a(C_5H_{5-a-d}R^{10}_d)Z^1M^1X^1Y^1$ | (3) |
| $(C_5H_{5-e}R^{11}_e)M^1X^1Y^1W^1$ | (4) |
| $M^1X^1Y^1W^1U^1$ | (5) |
| $L^1L^2M^2X^1Y^1$ | (6) | in which $Q^1$ represents a bonding group that crosslinks the two conjugated five-membered cyclic ligands $(C_5H_{5-a-b}R^8_b)$ and $(C_5H_{5-a-c}R^9_c)$; $Q^2$ represents a bonding group that crosslinks the conjugated five-membered cyclic ligand $(C_5H_{5-a-d}R^{10}_d)$ and the group $Z^1$; $R^8$, $R^9$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 of the Periodic Table; $M^2$ represents a transition metal of Groups 8 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^1, L^2, X^1, Y^1, W^1$ and $U^1$ may be bonded to each other to form a cyclic structure.

9. The method as claimed in claim 8, wherein, in the transition metal compound (A) of formula (4), the group $(C_5H_{5-e}R^{11}_e)$ is represented by any of the following formulae (I) to (VII)

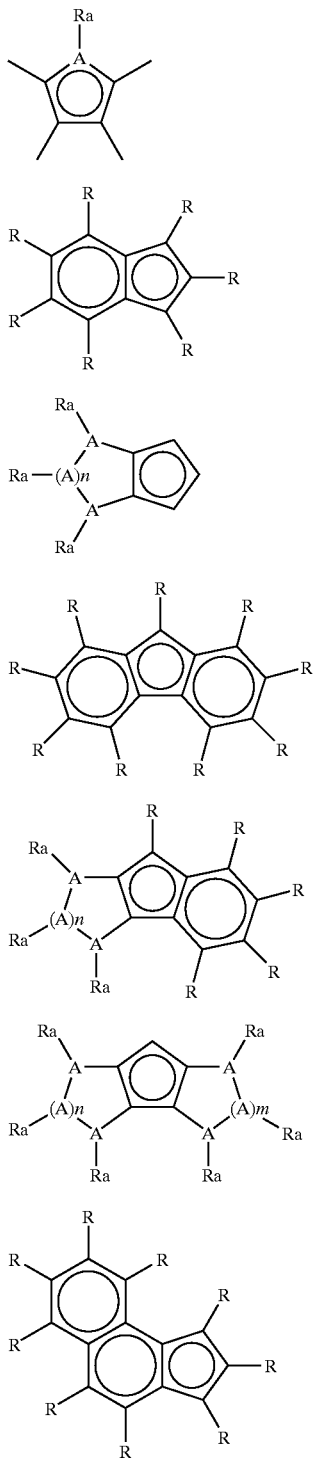

10. The method as claimed in claim 9, which is for producing styrenic polymers essentially having a syndiotactic structure.

11. A catalyst for polymerization of styrenes, which comprises:

(A) a transition metal compound, (B) an oxygen-containing compound and/or a compound capable of reacting with a transition metal compound to form an ionic complex, (C) a compound which is a reaction product of <1> at least one compound selected from the group of compounds consisting of formulae $(R^1)_3$—C—$R^3$ and $R^4$—CO—$R^5$ and <2> a compound of formula, $Z(R^2)_m$:

in which $R^1$, $R^4$ and $R^5$ are each an aromatic hydrocarbon group having from 6 to 30 carbon atoms, which may be the same or different, $R^3$ is an oxyaromatic hydrocarbon group having from 6 to 30 carbon atoms, and all of $R^1$ and $R^3$ to $R^5$ may optionally be bonded to each other to form a cyclic structure and Z represents a metal element of Groups 2 to 13 of the Periodic Table; m is an integer, indicating the valency of the metal element Z; and $R^2$ represents a hydrocarbon group;

and optionally, (D) an alkylating agent.

12. The catalyst for polymerization of styrenes as claimed in claim 11, wherein Z is aluminum.

13. The catalyst for polymerization of styrenes as claimed in claim 11, wherein $R^2$ is an alkyl group having at least 2 carbon atoms.

14. The catalyst for polymerization of styrenes as claimed in claim 11, wherein the transition metal compound (A) is represented by any of the following formulae (2) to (6):

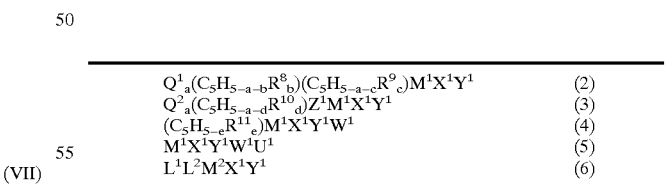

in which $Q^1$ represents a bonding group that crosslinks the two conjugated five-membered cyclic ligands $(C_5H_{5-a-b}R^8_b)$ and $(C_5H_{5-a-c}R^9_c)$; $Q^2$ represents a bonding group that crosslinks the conjugated five-membered cyclic ligand $(C_5H_{5-a-d}R^{10}_d)$ and the group $Z^1$; $R^8$, $R^9$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 of the Periodic Table; $M^2$ represents a transition metal of Groups 8 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^1$, $L^2$, $X^1$, $Y^1$, $W^1$ and $U^1$ may be bonded to each other to form a cyclic structure.

15. The catalyst for polymerization of styrenes as claimed in claim 14, wherein, in the transition metal compound (A) of formula (4), the group $(C_5H_{5-e}R^{11}{}_e)$ is represented by any of the following formulae (I) to (VII)

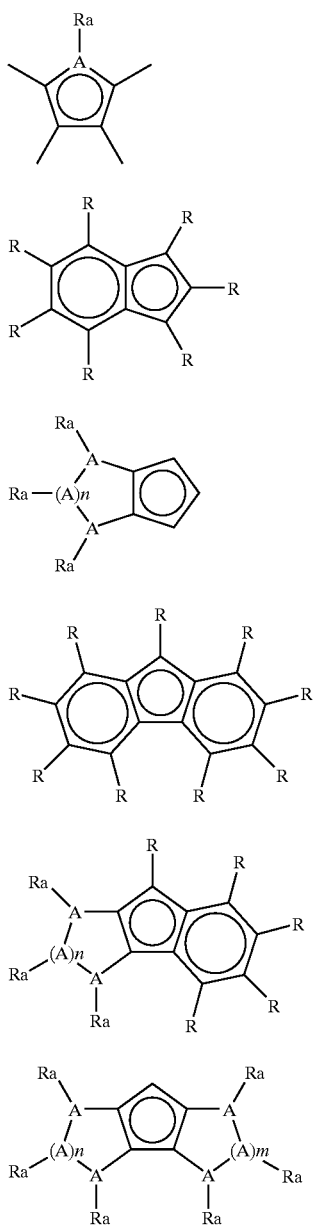

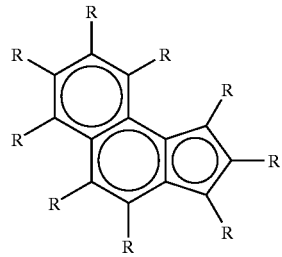

in which A represents an element of Group 13, 14, 15 or 16 of the Periodic Table, and plural A's may be the same or different; R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and may be optionally bonded to each other to form a cyclic structure; a represents 0, 1 or 2; and n and m each represent an integer of at least 1.

16. A method for producing styrenic polymers, which comprises polymerizing styrenes in the presence of the polymerization catalyst of claim 11.

17. The method as claimed in claim 16, which is for producing styrenic polymers essentially having a syndiotactic structure.

18. A catalyst for polymerization of styrenes, which comprises:

(A) a transition metal compound, (B) an oxygen-containing compound and/or a compound capable of reacting with a transition metal compound to form an ionic complex, (C) a compound which is a reaction product of <1> at least one compound selected from the group of compounds consisting of formulae $(R^1)_3$—C—$R^3$ and $R^4$—CO—$R^5$ and <2> a compound of formula, $Z(R^2)_m$:

in which $R^1$, $R^4$ and $R^5$ are each a phenyl group, $R^3$ is an oxyphenyl group, and all of $R^1$ and $R^3$ to $R^5$ may optionally be bonded to each other to form a cyclic structure and Z represents a metal element of Groups 2 to 13 of the Periodic Table; m is an integer, indicating the valency of the metal element Z; and $R^2$ represents a hydrocarbon group;

and optionally, (D) an alkylating agent.

19. The catalyst for polymerization of styrenes as claimed in claim 18, wherein Z is aluminum.

20. The catalyst for polymerization of styrenes as claimed in claim 18, wherein $R^2$ is an alkyl group having at least 2 carbon atoms.

21. The catalyst for polymerization of styrenes as claimed in Claim 18, wherein the transition metal compound (A) is represented by any of the following formulae (2) to (6):

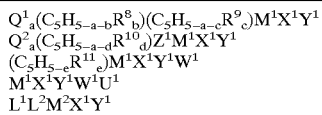

| | |
|---|---|
| $Q^1{}_a(C_5H_{5-a-b}R^8{}_b)(C_5H_{5-a-c}R^9{}_c)M^1X^1Y^1$ | (2) |
| $Q^2{}_a(C_5H_{5-a-d}R^{10}{}_d)Z^1M^1X^1Y^1$ | (3) |
| $(C_5H_{5-e}R^{11}{}_e)M^1X^1Y^1W^1$ | (4) |
| $M^1X^1Y^1W^1U^1$ | (5) |
| $L^1L^2M^2X^1Y^1$ | (6) | in which $Q^1$ represents a bonding group that crosslinks the two conjugated five-membered cyclic ligands ($C_5H_{5-a-b}R^8{}_b$) and ($C_5H_{5-a-c}R^9{}_c$); $Q^2$ represents a bonding group that crosslinks the conjugated five-membered cyclic ligand ($C_5H_{5-a-d}R^{10}{}_d$) and the group $Z^1$; $R^8$, $R^9$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 of the Periodic Table; $M^2$ represents a transition metal of Groups 8 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^1$, $L^2$, $X^1$, $Y^1$, $W^1$ and $U^1$ may be bonded to each other to form a cyclic structure.

22. The catalyst for polymerization of styrenes as claimed in claim 21, wherein, in the transition metal compound (A) of formula (4), the group ($C_5H_{5-e}R^{11}{}_e$) is represented by any of the following formulae (I) to (VII)

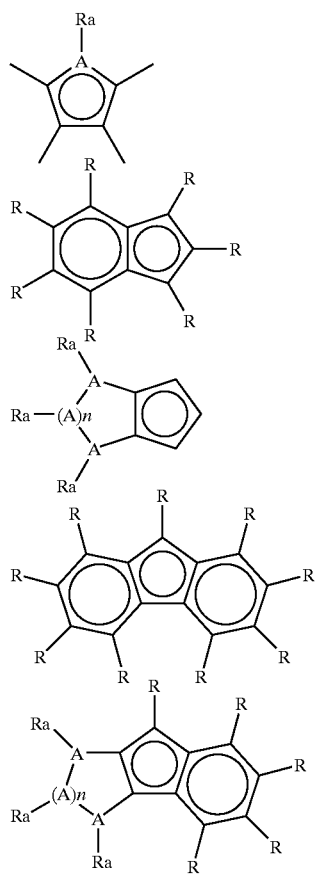

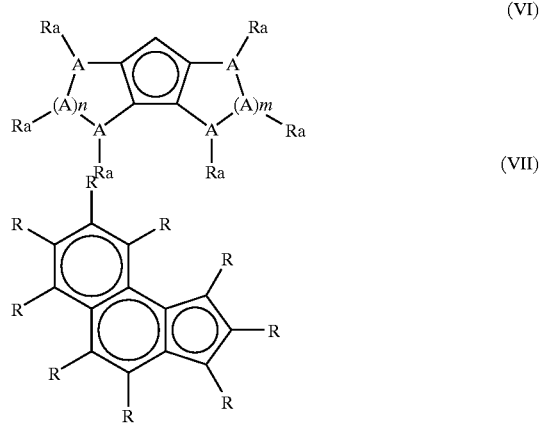

in which A represents an element of Group 13, 14, 15 or 16 of the Periodic Table, and plural A's may be the same or different; R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and may be optionally bonded to each other to form a cyclic structure; a represents 0, 1 or 2; and n and m each represent an integer of at least 1.

23. A method for producing styrenic polymers, which comprises polymerizing styrenes in the presence of the polymerization catalyst of claim 17.

24. The method as claimed in claim 23, which is for producing styrenic polymers essentially having a syndiotactic structure.

25. A catalyst for polymerization of styrenes, which comprises:

(A) a transition metal compound, (C) a compound which is a reaction product of <1> at least one compound selected from the group of compounds consisting of formulae $(R^1)_3$—C—$R^3$ and $R^4$—CO—$R^5$ and <2> a compound of formula, $Z(R^2)_m$: in which $R^1$, $R^4$ and $R^5$ are each a phenyl group, $R^3$ is an oxyphenyl group, and all of $R^1$ and $R^3$ to $R^5$ may optionally be bonded to each other to form a cyclic structure and Z represents a metal element of Groups 2 to 13 of the Periodic Table; $R^2$ represents a hydrocarbon group; m is an integer, indicating the valency of the metal element Z;

and optionally, (D) an alkylating agent.

26. The catalyst for polymerization of styrenes as claimed in claim 25, wherein Z is aluminum.

27. The catalyst for polymerization of styrenes as claimed in claim 25, wherein $R^2$ is an alkyl group having at least 2 carbon atoms.

28. The catalyst for polymerization of styrenes as claimed in claim 25, wherein the transition metal compound (A) is represented by any of the following formulae (2) to (6):

| | |
|---|---|
| $Q^1{}_a(C_5H_{5-a-b}R^8{}_b)(C_5H_{5-a-c}R^9{}_c)M^1X^1Y^1$ | (2) |
| $Q^2{}_a(C_5H_{5-a-d}R^{10}{}_d)Z^1M^1X^1Y^1$ | (3) |

-continued

| | |
|---|---|
| $(C_5H_{5-e}R^{11}{}_e)M^1X^1Y^1W^1$ | (4) |
| $M^1X^1Y^1W^1U^1$ | (5) |
| $L^1L^2M^2X^1Y^1$ | (6) | in which $Q^1$ represents a bonding group that crosslinks the two conjugated five-membered cyclic ligands $(C_5H_{5-a-b}R^8{}_b)$ and $(C_5H_{5-a-d}R^9{}_c)$; $Q^2$ represents a bonding group that crosslinks the conjugated five-membered cyclic ligand $(C_5H_{5-a-d}R^{10}{}_d)$ and the group $Z^1$; $R^8$, $R^3$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 of the Periodic Table; $M^2$ represents a transition metal of Groups 8 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^1$, $L^2$, $X^1$, $Y^1$, $W^1$ and $U^1$ may be bonded to each other to form a cyclic structure.

29. The catalyst for polymerization of styrenes as claimed in claim 28, wherein, in the transition metal compound (A) of formula (4), the group $(C_5H_{5-e}R^{11}{}_e)$ is represented by any of the following formulae (I) to (VII)

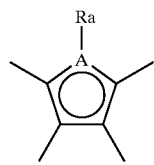
(I)

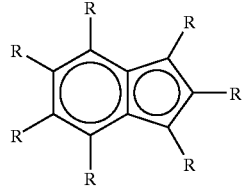
(II)

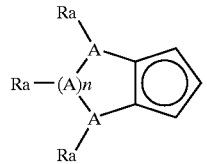
(III)

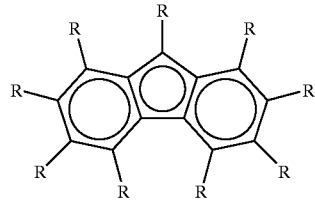
(IV)

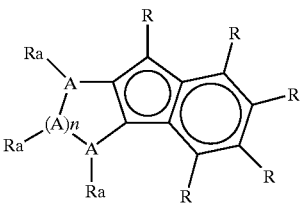
(V)

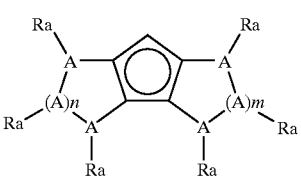
(VI)

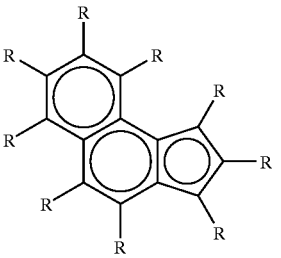
(VII)

in which A represents an element of Group 13, 14, 15 or 16 of the Periodic Table, and plural A's may be the same or different; R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and may be optionally bonded to each other to form a cyclic structure; a represents 0, 1 or 2; and n and m each represent an integer of at least 1.

30. A method for producing styrenic polymers, which comprises polymerizing styrenes in the presence of the polymerization catalyst of claim 25.

31. The method as claimed in claim 30, which is for producing styrenic polymers essentially having a syndiotactic structure.

32. A catalyst for polymerization of styrenes, which comprises:

(A) a transition metal compound,
(C) a compound which is a reaction product of <1> at least one compound selected from the group of compounds consisting of formulae $(R^1)_3$—C—$R^3$ and $R^4$—CO—$R^5$ and <2> a compound of formula, $Z(R^2)_m$:

in which $R^1$, $R^4$ and $R^5$ are each an aromatic hydrocarbon group having from 6 to 30 carbon atoms, which may be the same or different, $R^3$ is an oxyaromatic hydrocarbon group having from 6 to 30 carbon atoms, and all of $R^1$ and $R^3$ to $R^5$ may be optionally bonded to each other to form a cyclic structure and Z represents a metal element of Groups 2 to 13 of the Periodic Table; m is an integer, indicating the valency of the metal element Z; and $R^2$ represents a hydrocarbon group;

and optionally, (D) an alkylating agent.

33. The catalyst for polymerization of styrenes as claimed in claim 32, wherein $R^2$ is an alkyl group having at least 2 carbon atoms.

34. The catalyst for polymerization of styrenes as claimed in claim 32, wherein Z is aluminum.

35. The catalyst for polymerization of styrenes as claimed in claim 32, wherein the transition metal compound (A) is represented by any of the following formulae (2) to (6):

$$Q^1{}_a(C_5H_{5-a-b}R^8{}_b)(C_5H_{5-a-c}R^9{}_c)M^1X^1Y^1 \quad (2)$$
$$Q^2{}_a(C_5H_{5-a-d}R^{10}{}_d)Z^1M^1X^1Y^1 \quad (3)$$
$$(C_5H_{5-e}R^{11}{}_e)M^1X^1Y^1W^1 \quad (4)$$
$$M^1X^1Y^1W^1U^1 \quad (5)$$
$$L^1L^2M^2X^1Y^1 \quad (6)$$

in which $Q^1$ represents a bonding group that crosslinks the two conjugated five-membered cyclic ligands $(C_5H_{5-a-b}R^8{}_b)$ and $(C_5H_{5-a-c}R^9{}_c)$; $Q^2$ represents a bonding group that crosslinks the conjugated five-membered cyclic ligand $(C_5H_{5-a-d}R^{10}{}_d)$ and the group $Z^1$; $R^8$, $R^9$, $R^{10}$ and $R^{11}$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 of the Periodic Table; $M^2$ represents a transition metal of Groups 8 to 10 of the Periodic Table; $L^1$ and $L^2$ each represent a coordination-bonding ligand; $X^1$, $Y^1$, $Z^1$, $W^1$ and $U^1$ each represent a covalent-bonding or ionic-bonding ligand; and $L^1$, $L^2$, $X^1$, $Y^1$, $W^1$ and $U^1$ may be bonded to each other to form a cyclic structure.

36. The catalyst for polymerization of styrenes as claimed in claim 35, wherein, in the transition metal compound (A) of formula (4), the group $(C_5H_{5-e}R^{11}{}_e)$ is represented by any of the following formulae (I) to (VII)

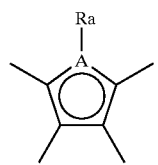
(I)

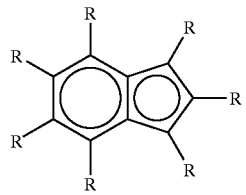
(II)

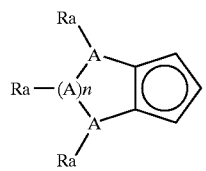
(III)

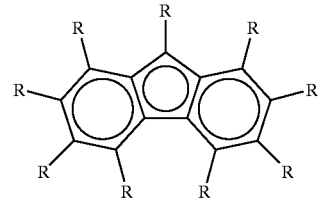
(IV)

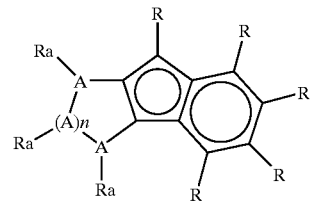
(V)

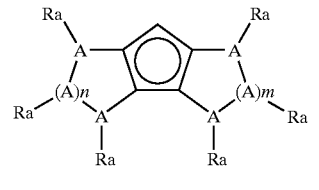
(VI)

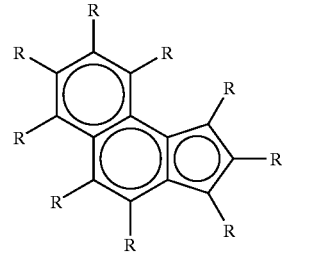
(VII)

in which A represents an element of Group 13, 14, 15 or 16 of the Periodic Table, and plural A's may be the same or different; R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and may be optionally bonded to each other to form a cyclic structure; a represents 0, 1 or 2; and n and m each represent an integer of at least 1.

37. A method for producing styrenic polymers, which comprises polymerizing styrenes in the presence of the polymerization catalyst of claim 32.

38. The method as claimed in claim 37, which is for producing styrenic polymers essentially having a syndiotactic structure.

* * * * *